United States Patent
Hunt et al.

(10) Patent No.: US 12,092,562 B2
(45) Date of Patent: Sep. 17, 2024

(54) DEVICE AND TESTING APPARATUS FOR LIQUID AND VAPOR WIRE EXPOSURE TESTING

(71) Applicant: The Lubrizol Corporation, Wickliffe, OH (US)

(72) Inventors: Gregory James Hunt, Etwall (GB); Michael Peter Gahagan, Derby (GB); Mitchell Andrew Peplow, Darley Dale (GB); Christopher Paul Prengaman, Willoughby Hills, OH (US); Ronny Riman, Friendswood, TX (US)

(73) Assignee: Tannas Company, Midland, MI (US)

( * ) Notice: Subject to any disclaimer, the term of this patent is extended or adjusted under 35 U.S.C. 154(b) by 293 days.

(21) Appl. No.: 17/793,965

(22) PCT Filed: Jan. 28, 2021

(86) PCT No.: PCT/US2021/015518
§ 371 (c)(1),
(2) Date: Jul. 20, 2022

(87) PCT Pub. No.: WO2021/155015
PCT Pub. Date: Aug. 5, 2021

(65) Prior Publication Data
US 2023/0071753 A1 Mar. 9, 2023

Related U.S. Application Data

(60) Provisional application No. 62/968,711, filed on Jan. 31, 2020.

(51) Int. Cl.
*G01N 17/02* (2006.01)
*G01N 17/04* (2006.01)

(52) U.S. Cl.
CPC ............ *G01N 17/02* (2013.01); *G01N 17/046* (2013.01)

(58) Field of Classification Search
CPC ...... G01N 17/02; G01N 17/04; G01N 17/046; B05D 7/20; Y10T 29/4906;
(Continued)

(56) References Cited

U.S. PATENT DOCUMENTS

| 3,876,381 A | 4/1975 | Shaffer et al. |
| 5,481,498 A | 1/1996 | Patel |

(Continued)

FOREIGN PATENT DOCUMENTS

| EP | 4097450 B1 | 12/2023 |
| WO | WO 2000079256 A1 | 12/2000 |
| WO | WO 2011048378 A2 | 4/2011 |

OTHER PUBLICATIONS

Gahagan, et al., "New Insights on the Impact of Automatic Transmission Fluid (ATF) Additives on Corrosion of Copper," Int. J. Automotive Engineering, 7, pp. 115-120 (2016).

(Continued)

*Primary Examiner* — Son T Le
(74) *Attorney, Agent, or Firm* — Fay Sharpe/Lippes Mathias; Christopher John Rudy

(57) ABSTRACT

A testing device includes a scaffold for supporting conductive wires. The scaffold is placed in housing in which liquid and vapor phases of a fluid are provided, such that a first of the conductive wires extends into the liquid and a second of the conductive wires remains in the vapor throughout a test. The scaffold may include a plurality of lower support members and a plurality of upper wire support members, each of the support members including a plurality of routing (Continued)

supports to wrap a respective one of the test wires around. The device allows measurements to be made contemporaneously for the test wires.

26 Claims, 23 Drawing Sheets

(58) Field of Classification Search
CPC ......... Y10T 29/49071; Y10T 29/49004; Y10T 29/49764; Y10T 29/53022; Y10T 117/1004
See application file for complete search history.

(56) References Cited

U.S. PATENT DOCUMENTS

| | | | |
|---|---|---|---|
| 2004/0060344 A1 | 4/2004 | Kauffman et al. | |
| 2006/0105467 A1 | 5/2006 | Niksa et al. | |
| 2011/0056726 A1* | 3/2011 | Schuller | H01B 3/308 |
| | | | 427/117 |
| 2011/0291674 A1* | 12/2011 | Hosokawa | H01F 27/402 |
| | | | 324/658 |
| 2014/0347071 A1* | 11/2014 | Montanari | G01R 31/1281 |
| | | | 324/553 |
| 2023/0194475 A1* | 6/2023 | Peplow | G01N 27/74 |
| | | | 324/204 |

OTHER PUBLICATIONS

Hunt, "New Perspectives on the Temperature Dependence of Lubricant Additives on Copper Corrosion," SAE Int. J., Fuels Lubr., 10(2) 521-527 (Jun. 2017).

Hunt, "New Perspectives on Lubricant Additive Corrosion: Comparison of Methods and Metallurgy," SAE Technical Paper, 2018-01-0656, pp. 1-10 (Apr. 2018).

Hunt, et al., "Wire resistance method for measuring the corrosion of copper by lubricating fluids" Lubrication Science, 29: 279-290 (2017).

Jin, et al., "Mechanism of magnetite formation in high temperature corrosion by model naphthenic acids," Corrosion Science, 111, pp. 822-834 (2016).

Maughan, "What is the Best Electric Vehicle Battery Cooling System?," Avid Technology, 5 pages (2020).

* cited by examiner

DEVICE AND TESTING APPARATUS FOR LIQUID AND VAPOR WIRE EXPOSURE TESTING

This application claims the priority of International Patent Application No. PCT/US2021/015518, filed Jan. 28, 2021, and U.S. Provisional Application Ser. No. 62/968,711, filed Jan. 31, 2020, from which the PCT application claims priority, the disclosures of each of which are incorporated herein in their entireties by reference.

BACKGROUND

This disclosure and the exemplary embodiments described herein relate to testing devices, methods and systems and in particular, to a scaffold and a testing device and apparatus incorporating the scaffold which are suited to measuring wire corrosion in liquid and vapor phases of a fluid, contemporaneously.

Traditional methods for monitoring corrosion processes and mechanisms in real time can be both time consuming and challenging to interpret, especially when evaluations at multiple temperatures are desired.

Corrosion is a highly complex and chaotic multicomponent scientific problem and the most common way to evaluate the amount of corrosion caused by a lubricant additive to a copper surface is using the standard ASTM D130 test method which compares a copper test coupon, that has been immersed in a lubricant for several hours, to a set of standards and a rating is given based on the color. Coupon or strip tests can be expanded to include additional information such as an end of test concentration of copper in solution or mass loss/gain information, however these types of test in isolation provide no detail about the chemical kinetics or time dependence of the corrosion process. There are a number of issues regarding the suitability of this test, the first being that it was originally designed to test the corrosiveness of petroleum products (base oil) to copper. The second is that this test gives a visual rating only and provides no information as to what is happening at the surface. Such information is useful in evaluating the impact of oil formulary on metal corrosion. The purpose of performing corrosion testing is to provide information around lubricant compatibility and corrosion performance of in-service lubricants and one way to achieve this is using long duration elevated temperature corrosion tests. This approach is appropriate only if the same corrosion process occurs at the elevated temperature and is not affected by new or competing reactions that are only viable at the elevated temperature.

According to one previous design, a wire support design utilizes a series of pegs extending from a central shaft to wrap a nominal length of wire, e.g. 1 meter, for testing in a liquid, but not its vapor, within a container. The single wire peg design requires the wire to zig zag between the pegs which enables the necessary length of wire within the space of the container. The single wire peg wire support is immersed in the test fluid inside the container, holding the length of wire under the fluid, thereby allowing corrosion to occur to the wire. The test wire is terminated by soldering the ends of the wire onto gold plated connector contacts that are located in two top holes of a head of the single wire support. Routing the wire to prepare samples for testing is time consuming.

There remains a need for a scaffold and a device which allow conductive wires to be supported in the same housing, facilitating the generation of corrosion test results in real-time for a solution and a vapor phase of the solution.

BRIEF DESCRIPTION

In accordance with one aspect of the exemplary embodiment, a scaffold includes a plurality of spaced lower support members, each of the plurality of lower support members including a plurality of first routing supports for spacing a plurality of turns of an associated first test wire, when the first test wire is wound around the plurality of lower support members. The scaffold further includes a plurality of spaced upper support members, each of the plurality of upper support members including a plurality of second routing supports for spacing a plurality of turns of an associated second test wire, when the second test wire is wound around the plurality of upper support members. A closure member provides for connections between ends of the first test wire and respective associated external conductors and provides for connections between ends of the second test wire and respective associated external conductors. The closure member, or an optional upper cross member attached thereto, is attached to a first end of each of the plurality of upper support members. A second cross member is longitudinally spaced from the closure member. The second cross member is attached to a first end of each of the plurality of lower support members and is attached to a second end of each of the plurality of upper support members to laterally space the plurality of lower support members and the plurality of upper support members.

In various aspects, the scaffold thus described may further include a third cross member, longitudinally spaced from the closure member by the second cross member, the third cross member being attached to a second end of each of the plurality of lower support members.

At least one of the first routing supports may include an aperture for receiving the first test wire therethrough. The first and second sets of routing supports may include notches. The first and second routing supports may be longitudinally spaced on the respective upper and lower support members. Each of the lower support members includes at least three, or at least four, or at least five of the first routing supports and each of the upper support members may include at least three, or at least four, or at least five of the second routing supports.

The closure member may have a tapered rim.

Each of the lower support members may include an aperture for carrying the first test wire therethrough. The upper and lower support members may be parallel to each other. There may be at least four, or at least five, or at least six upper support members. There may be at least four, or at least five, or at least six lower support members. The upper support members may be arcuately offset from the lower support members. The second cross member may include arcuately spaced slots, the second ends of the upper support members being received in alternate ones of the slots, the first ends of the lower support members being received in remaining alternate ones of the slots.

The second cross member may include at least one groove for guiding the first test wire from the closure member to the lower support members and back to the closure member.

The closure member may include holes for receiving first and second temperature sensors.

The plurality of lower support members, the plurality of upper support members, the closure member, the second cross member, and the first cross member, where present, may all be formed of plastic.

The plurality of lower support members, the plurality of upper support members, the closure member, the second cross member, and the first cross member, where present, may be formed by one of 3D printing and injection molding.

At least one of a length of each wire turn defined by the plurality of lower support members and a number of the first routing supports differs from at least one of a length of each wire turn defined by the plurality of upper support members, and a number of the second routing supports to provide an equal routing length for the first and second test wires.

The plurality of spaced lower support members may be longitudinally aligned with a central axis of the scaffold and the plurality of spaced upper support members may be longitudinally aligned with the central axis.

In another aspect, an assembly includes a scaffold as described in any one or more of the aspects above and further includes the first and second test wires, the first and second test wires being electrically conductive.

The first and second test wires may be of equal length and/or of equal diameter.

One or more of the first and second test wires may be formed of copper or an alloy thereof.

In another aspect, a testing device includes a scaffold as described in any one or more of the aspects above or an assembly as described in any one or more of the aspects above. The testing device further includes a housing shaped to receive the scaffold with the closure member of the scaffold closing an upper end of the housing to form a vessel for holding an associated liquid in contact with the first test wire such that a vapor phase of the liquid contacts the second test wire.

In various aspects, the testing device may further include a solution phase temperature sensor, which is positioned in the housing to measure a temperature of the liquid and/or a vapor phase temperature sensor, which positioned in the housing to measure a temperature of the vapor. The solution phase temperature sensor and vapor phase temperature sensor may be connected with external conductors through the closure member.

The testing device may further include a heater configured to heat the liquid in the housing to form the vapor.

The testing device may further include one of first and second electrical systems. The first electrical system may include a first current source connected across ends of the first test wire to supply an electric current through the first test wire, a second current source connected across ends of the second test wire to supply an electric current through the second test wire, a first voltmeter connected across ends of the first test wire to measure a voltage across the first test wire, and a second voltmeter connected across ends of the second test wire to measure a voltage across the second test wire. The second electrical system may include a first voltage source connected across ends of the first test wire to generate a voltage through the first test wire, a second voltage source connected across ends of the second test wire to generate a voltage through the second test wire, a first ammeter connected across ends of the first test wire to measure an electric current across the first test wire, and a second ammeter connected across ends of the second test wire to measure an electric current across the second test wire.

The testing device may further include at least one of first and second electrodes, the first electrode being immersed in the solution, the second electrode being immersed in the vapor, a voltage or current source, connected with the first electrode, where present, which causes a current to flow between the first electrode and the first wire; a voltage or current source, connected with the second electrode, where present, which causes a current to flow between the second electrode and the second wire.

A testing apparatus may include a testing device as described in any of the aspects above and a monitoring system which receives signals from the first voltmeter and the second voltmeter, or from the first ammeter and the second ammeter, and computes and outputs information based thereon.

In various aspects, the monitoring system may include a data acquisition component, which acquires at least one of a voltage and an electric current through the test wires over time, a data analysis component, which processes the acquired at least one of the voltage and the electric current at a plurality of times and computes the information based thereon, and an output component, which outputs the information. The information may include a measure of the corrosion of each of the test wires. The measure of the corrosion of each of the test wires may include a computed change in a diameter or radius of the test wires. The monitoring system may be in communication with temperature sensors, mounted in the liquid and vapor, respectively. The information may include a measure of corrosion as a function of temperature of the liquid.

In accordance with another aspect of the exemplary embodiment, a method includes wrapping a first test wire around a plurality of spaced lower support members of a scaffold, such as a scaffold as described in any of the aspects above. A second test wire is wrapped around a plurality of spaced upper support members of the scaffold. A test fluid is introduced to a housing. The scaffold and first and second test wires are inserted into the housing such that the second test wire is spaced from a liquid phase of the test fluid and the closure member closes an open end of the housing. The test fluid in the housing is heated to generate a vapor phase, which contacts the second test wire. An electrical property of the first and second test wires, which changes over time, is measured. Information is determined based, on a change in the electrical property of each wire.

In various aspects, the measuring of the electrical property of the first and second test wires over time comprises measuring one of an electric current and a voltage. The information may include a measure of corrosion of the test wires. The method may further include mounting a solution phase temperature sensor to contact the liquid phase, mounting a vapor phase temperature sensor to contact the vapor phase, and computing a temperature dependence of the measure of corrosion. In the method, the test fluid may include a lubricant, a coolant, and/or a corrosion inhibitor. At least one of the test wires may be formed of copper or a copper alloy. The test wires may be of equal length and/or equal diameter. The test wires may each have a length of at least 50 cm, or up to 500 cm. The test wires may each have a diameter of at least 0.05 mm, or up to 5 mm.

In accordance with another aspect of the exemplary embodiment, a testing device includes a scaffold for supporting associated first and second test wires, a housing shaped to receive the scaffold, whereby a closure member of the scaffold closes an upper end of the housing to form a vessel for holding an associated liquid in contact with the first test wire such that a vapor phase of the liquid contacts only the second test wire.

In various aspects, the testing device may further include a solution phase temperature sensor, positioned in the housing to measure a temperature of the liquid, and/or a vapor phase temperature sensor, positioned in the housing to measure a temperature of the vapor. The solution and vapor phase temperature sensors may each be connected with a respective external conductor through the closure member. The testing device may further include a heater configured to heat the liquid in the housing to form the vapor.

The testing device may further include one of first and second electrical systems, the first electrical system including a first current source connected across ends of the first test wire to supply an electric current through the first test wire, a second current source connected across ends of the second test wire to supply an electric current through the second test wire, a first voltage measuring device connected across ends of the first test wire to measure a voltage across the first test wire and a second voltage measuring device connected across ends of the second test wire to measure a voltage across the second test wire. The second electrical system may include a first voltage source connected across ends of the first test wire to generate a voltage through the first test wire, a second voltage source connected across ends of the second test wire to generate a voltage through the second test wire, a first current measuring device connected across ends of the first test wire to measure an electric current across the first test wire, and a second current measuring device connected across ends of the second test wire to measure an electric current across the second test wire.

The testing device may further include first and second electrodes, one of the electrodes being immersed in the solution, and a voltage or current source, connected with the electrodes, which causes a current to flow between the electrodes and the wires.

DETAILED DESCRIPTION

Aspect of the exemplary embodiment relate to a scaffold, a testing device including the scaffold, a testing apparatus or "system" including the device, and a method, which can be used for generating corrosion test results in real-time simultaneously for conductive wires supported in a solution and vapor phase of a fluid, respectively. An exemplary testing device is a wire corrosion testing device which integrates a solution space wire support and a vapor phase space wire support in a single scaffold within a common housing, e.g., a container, such as a beaker, that receives the fluid and scaffold. The disclosed wire corrosion testing device provides for both the solution and vapor space wire corrosion test to be evaluated at the same time, i.e., contemporaneously, in the same housing.

Figure 1:
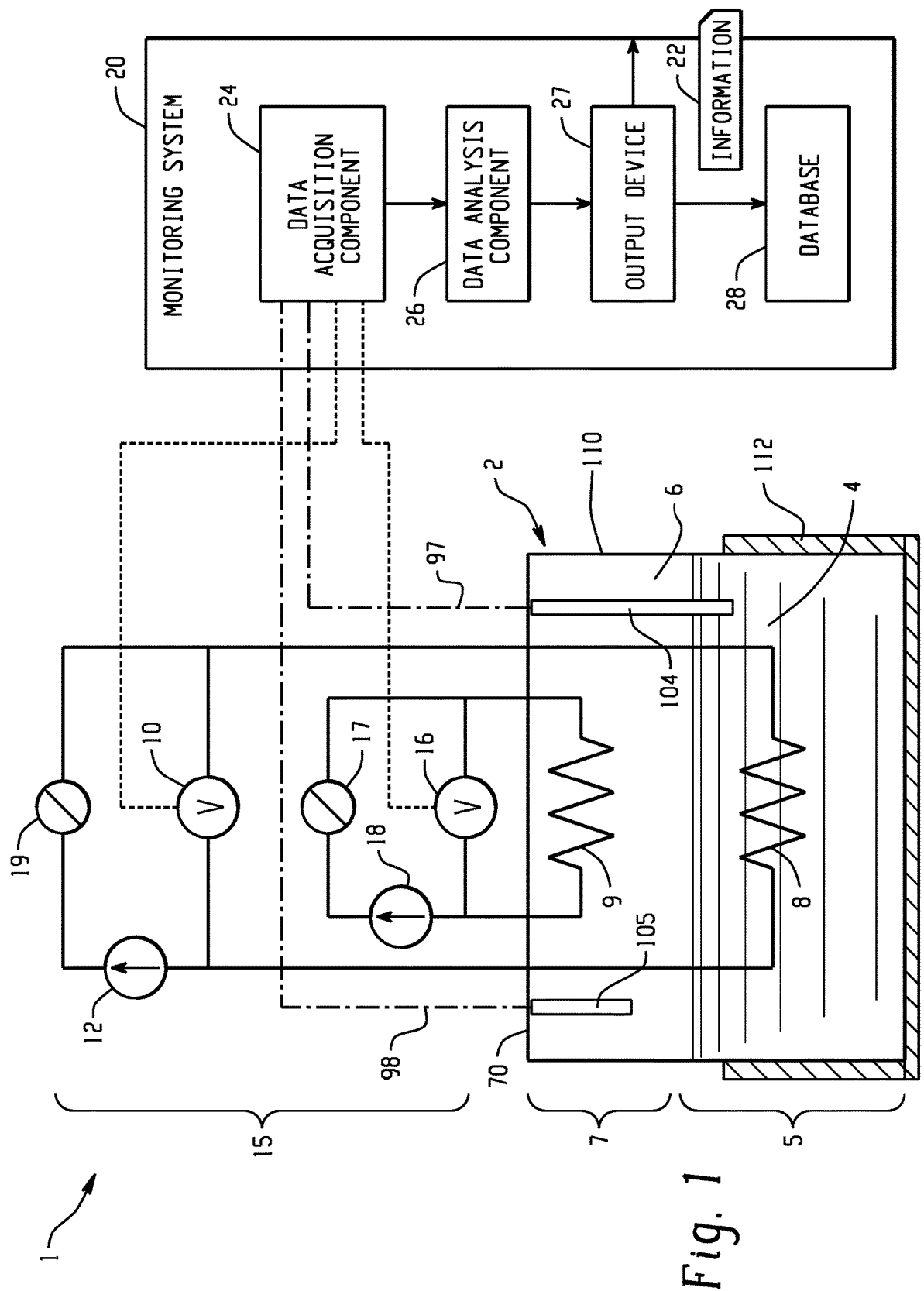
FIG. 1 is an electrical schematic of a testing apparatus including a solution and vapor wire corrosion testing device according to one exemplary embodiment.

With reference to FIG. 1, an electrical schematic of a testing apparatus according to one exemplary embodiment is shown. The testing apparatus includes a testing device 1, such as a solution and vapor wire corrosion testing device, which includes a sealed vessel 2, such as a beaker or other container. The vessel 2 holds a test fluid, such as a lubricant, in a liquid (solution) form 4 in a solution space 5, and in a vapor (gaseous) 6 form, in a vapor space 7 of the vessel, which is above the solution space 5. The vapor 6 is in contact with the liquid 4 at a surface of the liquid and is derived, at least in part, from the liquid. A first electrically conductive test wire 8 (solution test wire) is at least partially suspended in the liquid 4. A second electrically conductive test wire 9 (vapor test wire) is suspended in the vapor 6, but not in the liquid 4. The test wires 8, 9 are formed from an electrically conductive material, such as copper (e.g., at least 95 wt. % copper), or an alloy thereof. Other electrically conductive materials may alternatively or additionally be used for one or both of the wires, such as silver, titanium, gold, nickel, platinum, zirconium, niobium, or tantalum, alloy thereof, or the like. Each wire may have a uniform diameter along the length of the wire. In the illustrated embodiment, both wires are formed of the same material and have the same diameter (e.g., the diameter of the first test wire 8 is within ±5% of the second test wire 9). Having wires 8, 9 of a same known length and diameter simplifies corrosion measurements.

In other embodiments, wires formed of dissimilar materials and/or lengths and/or diameters may be used. Using wires 8, 9 of dissimilar metals allows the wires to act as electrodes (cathode and anode, or vice versa). Which wire is the cathode depends on the experimental conditions. This configuration enables the effects of electrolysis processes, due to current flowing through the fluid between the wires, to be studied.

While two wires are used in the illustrated embodiment, in other embodiments, fewer or more than two wires may be used in a test, such as two (or more) first test wires 8 and/or two (or more) second test wires 9. The test wires 8, 9 may each have a length of at least 50 cm, or up to 500 cm, e.g., about 100 cm. The test wires 8, 9 may each have a diameter of at least 0.05 mm, or up to 5 mm.

The exemplary testing apparatus includes an electrical system 15, which measures an electrical property of the test wires. In the illustrated embodiment, an electrical property, such as a voltage, across the first test wire 8 is detected by a first voltage measuring device, such as a first voltmeter 10. A first electric current source, such as a DC or AC source 12, supplies an electric current to the first test wire 8. A voltage across the second test wire 9 is detected by a second (or the same) voltage measuring device, such as a second voltmeter 16. A second electric current source, such as a DC or AC source 18, supplies an electric current to the second test wire 9. In some embodiments, relay controls 17, 19 may be employed to switch between a powered state and a measurement state for the wires 8, 9.

In some embodiments, the first test wire 8 is fully immersed in the solution 4. This may be achieved by replacing the portion of the wire 4 extending into the vapor space with a larger gauge wire or shielded (e.g., coated) wire (not shown).

The testing apparatus further includes a monitoring system 20, which receives electrical signals (e.g., measured voltages) from the voltmeters 10, 16 over the course of a test and processes the signals to generate and output information 22. In one embodiment, information 22 is related to a change in diameter of the test wires 8, 9 over the course of the test, due to corrosion. The length and diameter of the test wires 8, 9 may be selected to provide electrical signals that can be encompassed by the monitoring system 20. The illustrated monitoring system 20 includes a data acquisition component 24, which acquires the electrical signals, and a data analysis component 26, which processes the acquired signals to generate the information 22. Information 22 may be output by an output device 27, e.g., stored in local or remote memory, e.g., in a suitable database 28, or other data structure, output to a display, or otherwise output.

In one embodiment, the lubricant to be tested in the device 1 is a composition suited for lubricating a machine, such as an engine or transmission of a vehicle. Example lubricants of this type include a base oil, of lubricating viscosity, e.g., as a major portion of the lubricant, and one or more additives, such as detergents, viscosity improvers, corrosion inhibitors, pour point depressants, anti-wear agents, and the like. The corrosion of the test wires 8, 9 in the liquid and vapor phases 4, 6 of the lubricant in the wire corrosion testing device 1 is determined over time by the monitoring system 20 and can be used to assess the suitability of a given lubricant for use in a machine, such as an engine or transmission system of a vehicle, operating at a temperature where liquid and vapor phases of the lubricant may be present. Changes to the additives can be assessed to determine whether reductions in corrosion rates can be achieved. Similarly, changes in materials of machine components can be assessed to determine whether they are more suited to resisting corrosion by a given lubricant.

In another embodiment, the fluid to be tested in the device 1 is a cooling liquid suited to use for cooling a heat-generating device. In another embodiment, the fluid to be tested in the device 1 is an aqueous solution, such as a solution containing one or more dissolved salts, such as sodium chloride. In one embodiment, the fluid to be tested in the device 1 is a liquid suited to use in a battery, such as a battery acid.

Figure 4:
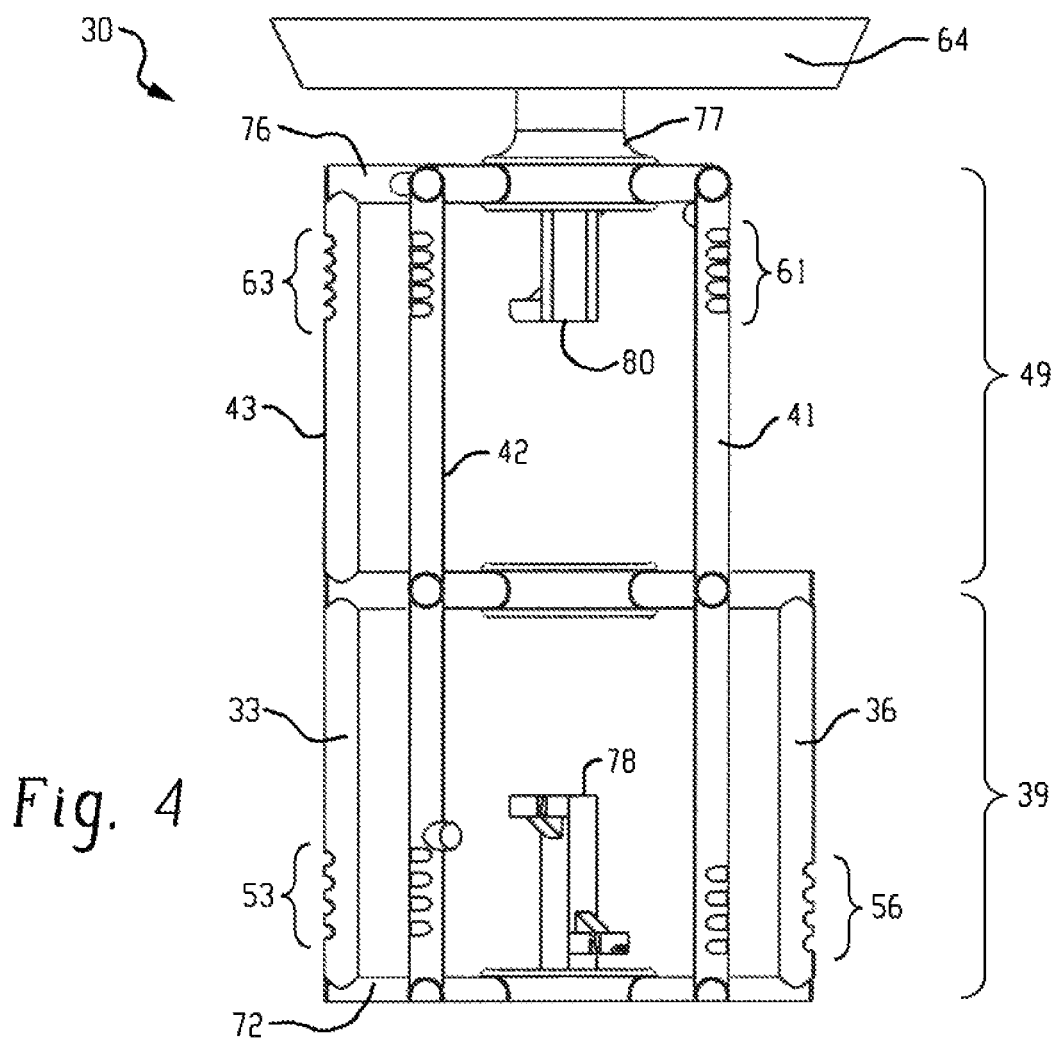
FIG. 4 is a front view of the scaffold of FIG. 2.
Figure 5:
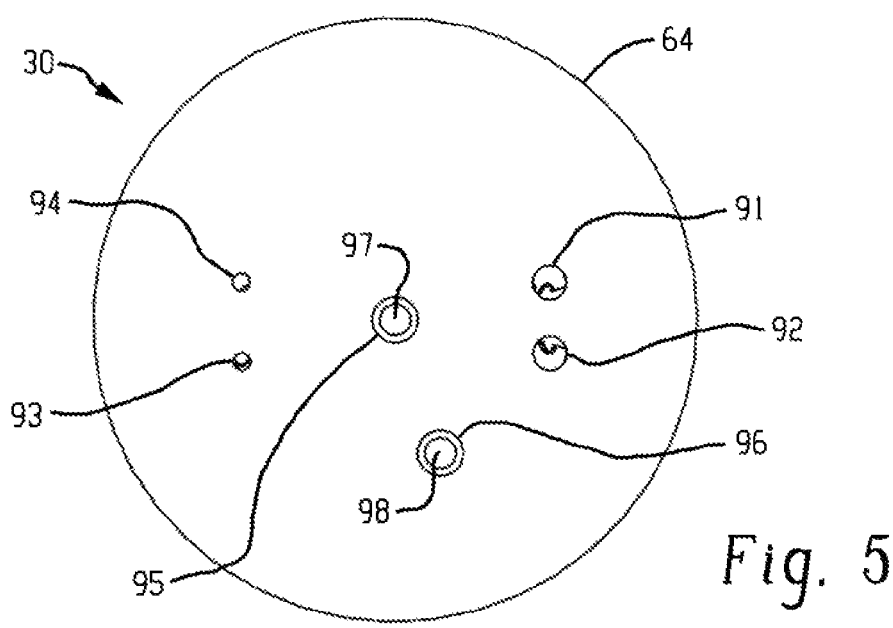
FIG. 5 is a top view of the scaffold of FIG. 2.
Figure 6:
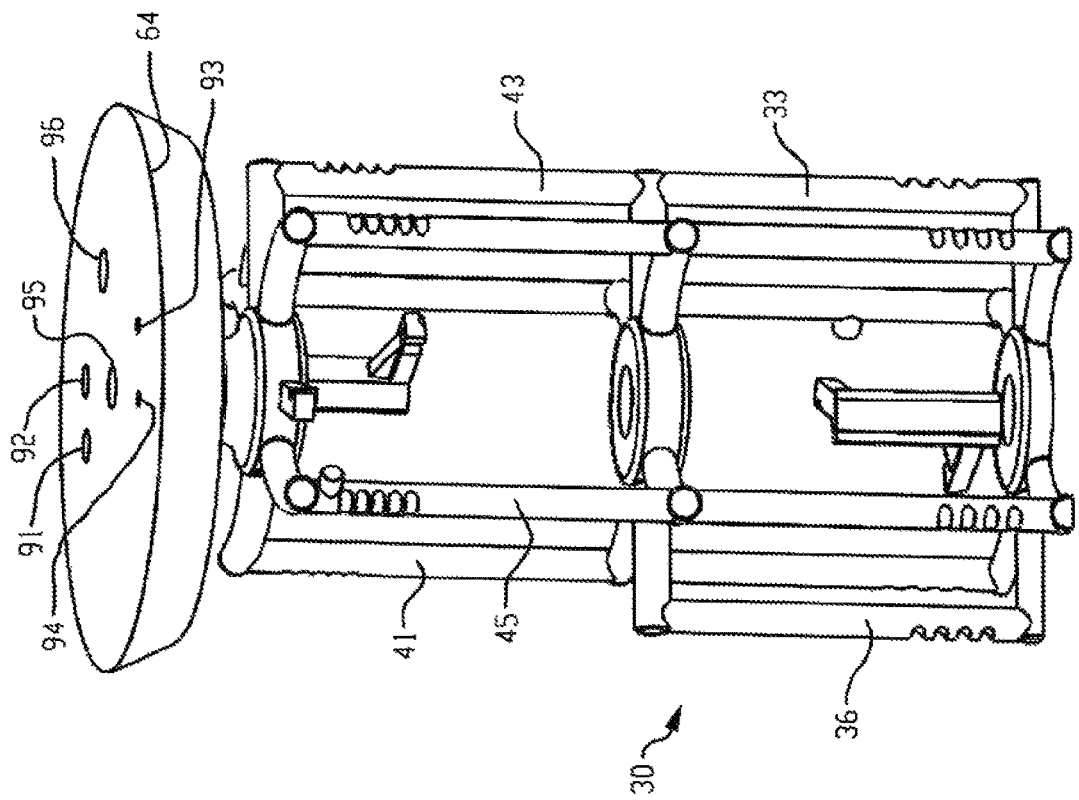
FIG. 6 is a third perspective view of the scaffold of FIG. 2.
Figure 7:
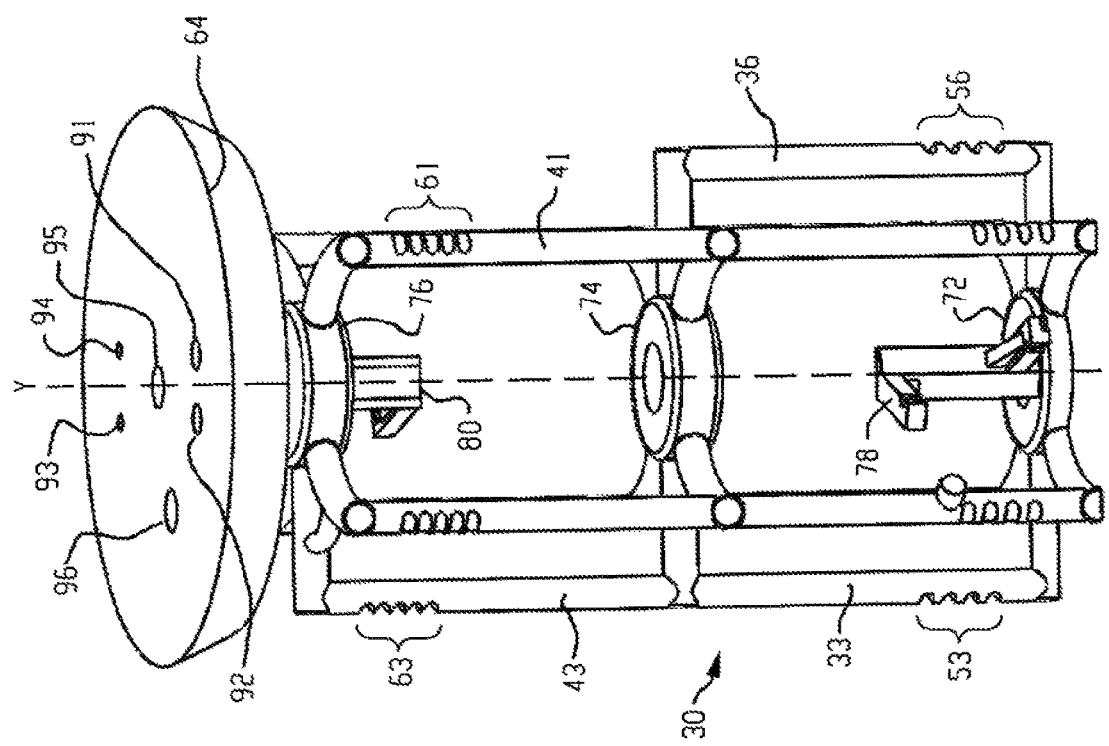
FIG. 7 is a fourth perspective view of the scaffold of FIG. 2.

With reference also to FIGS. 2-11, the test wires 8, 9 may be supported on a common support structure ("scaffold") 30. The scaffold 30 includes a plurality of lower support members, such as 3, 4, 5, or 6 or 8 lower support members 31, 32, 33, 34, 35, 36 (six lower support members are shown), which are connected, via first and second ends 37, 38, to form a solution space wire support 39, and a plurality of upper support members, such as 3, 4, 5, or 6 or 8 upper support members 41, 42, 43, 44, 45, (five upper support members are shown), which are connected, via respective first and second ends 47, 48, to form a vapor phase space wire support 49. The solution and vapor space wire supports 39, 49 are connected to each other. In one embodiment, pairs of upper and lower support members, such as support members 32 and 42 are connected, e.g., formed as a single piece. In other embodiments, the support members are indirectly connected. The lower and upper support members each extend longitudinally, e.g., in parallel with a cylindrical axis Y of the scaffold 30 (FIG. 6). The scaffold 30 may be wholly or partially formed by 3D printing or injection molding, e.g., formed of plastic or other non-conductive material.

The illustrated support members are generally cylindrical, between respective opposed ends 39, 40, 47, 49 although other shapes are contemplated which provide for a minimal area of contact with the test wires. The support members may be formed from an electrically insulative material, such as plastic, glass, or ceramic, or from a mixture or combination of such materials. The lower support members 31, 32, 33, 34, 35, 36 and upper support members 41, 42, 43, 44, 45, are spaced from each other to define gaps 50 between the support members. The gaps 50 allow the test fluid to circulate around the test wires and maximize the exposed surface area of the test wires 8, 9.

Routing supports, formed in or on each of the upper and lower support members, support and space a plurality of turns 51, 52, etc. of the test wires 8, 9, such as at least three, or at least four, or at least five complete turns, each complete turn circling all of the respective lower or upper support members. In one embodiment, the test wires 8, 9 may be supported in sets of spaced notches in each of the respective lower and upper support members to maintain the turns 51, 52 of the wire out of electrical contact with each other. For example, the routing supports may include sets 53, 56, etc. of solution wire notches defined in the lower support members support the first test wire 8 and sets 61, 63, etc. of vapor wire notches defined in the upper support members support the second test wire 9 (FIG. 4). In another embodiment (not shown), the routing supports comprise projections which extend laterally outward from the lower and upper support members.

The exemplary scaffold includes or is connected with a closure member 64, such as a lid, which seals the open end of the vessel 2. A routing length l for each wire 8, 9 (the length of each wire supported by the scaffold, from the lid 64, around the support members and back to the lid) can be made to be equal by having a different number of turns 51, 52 of each wire (e.g., by providing a different number of notches on upper and lower support members). Additionally, or alternatively, the length of each turn can be different, e.g., by spacing the upper support members to provide a larger diameter of each turn 52. By equal routing length, it is meant that the routing lengths vary by no more than 5% or no more than 1% or no more than 0.1%.

Figure 2:
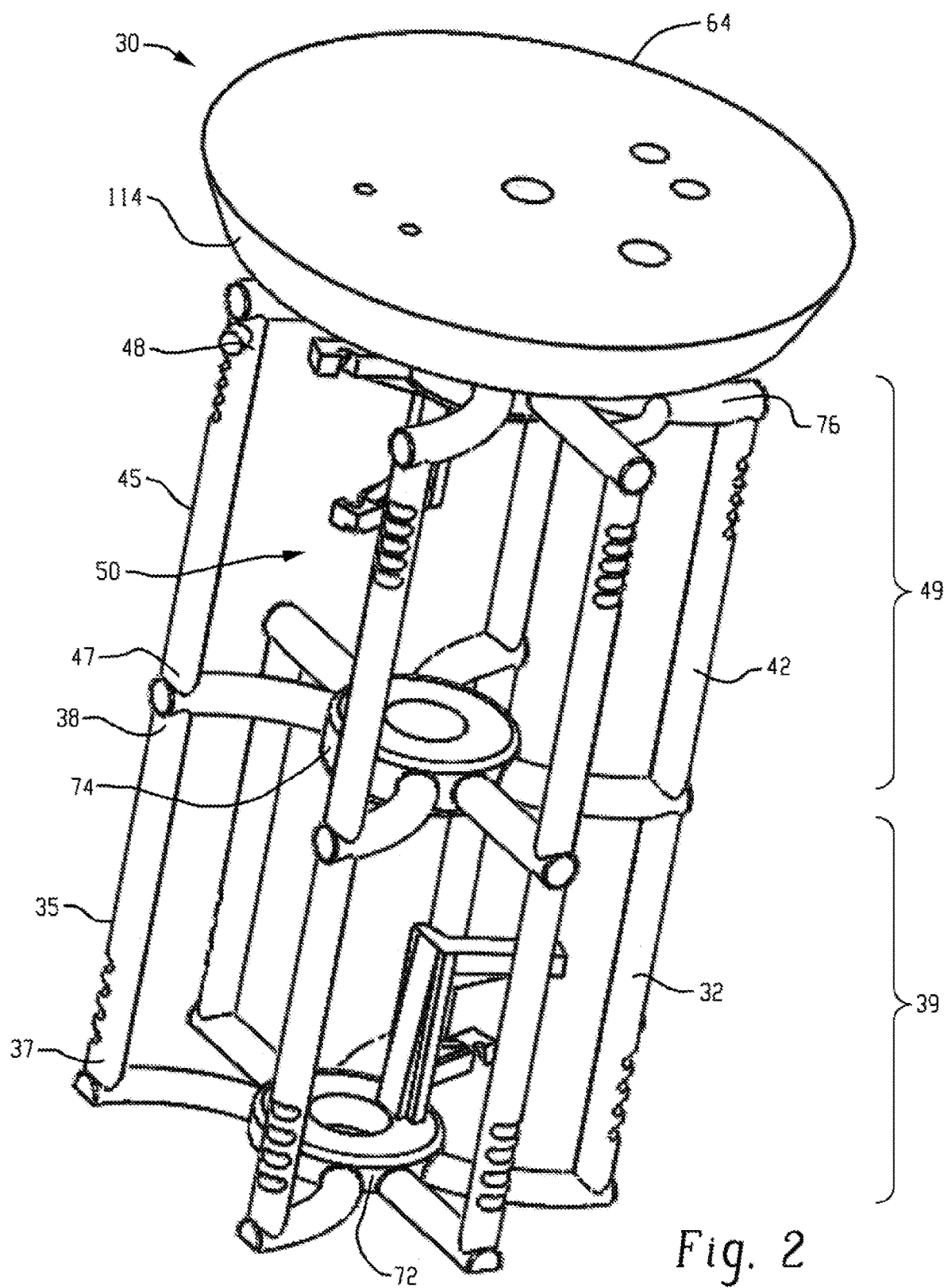
FIG. 2 is a first perspective view of a first embodiment of a scaffold for the solution and vapor phase wire corrosion testing device of FIG. 1, according to one exemplary embodiment.
Figure 3:
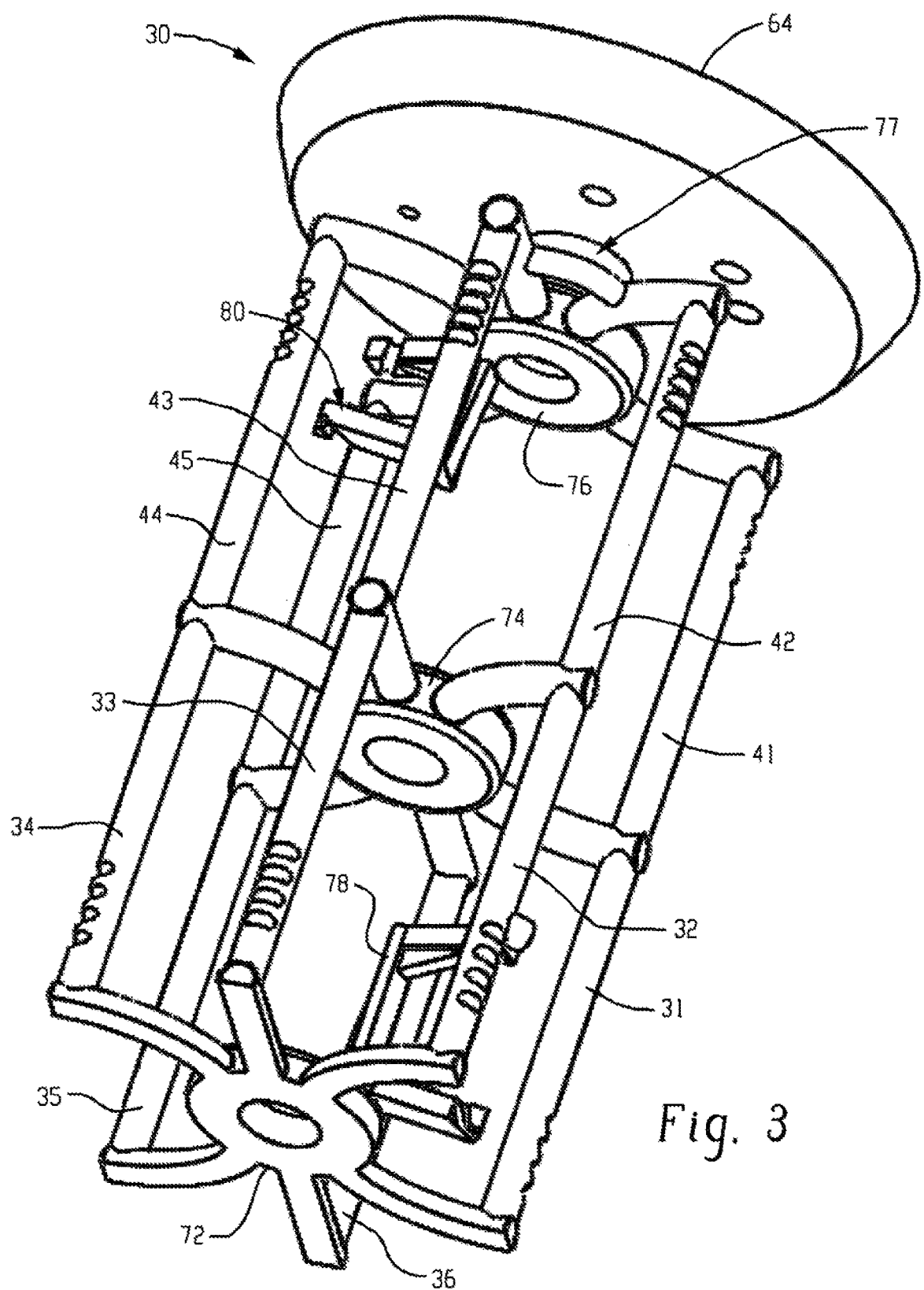
FIG. 3 is a second perspective view of the scaffold of FIG. 2.

The illustrated scaffold 30 includes a closure member or lid 64, which serves to close the top of the vessel 2. A lower cross member ("hub") 72, an intermediate cross member ("hub") 74, and an upper cross member ("hub") 76 serve to arcuately space the upper and lower support members and connect the solution and vapor space wire supports 39, 49 (FIGS. 2 and 3). The lower cross member 72 and intermediate cross member 74 are longitudinally spaced from each other, and are generally perpendicular to the lower support members 31, 32, 33, 34, 35, 36. The intermediate cross member 74 and upper cross member 76 are longitudinally spaced from each other, and are generally perpendicular to the upper support members 41, 42, 43, 44, 45. The upper cross member 76 may be threaded or otherwise connected to the lid 64, e.g., by a central member 77.

As shown in FIGS. 3 and 4, a solution wire support ("post") 78 extends upward from the lower cross member 72 and a vapor wire support ("post") 80 extends downward from the upper cross member 76 to support the respective wire as it enters from the lid 64.

Figure 8:
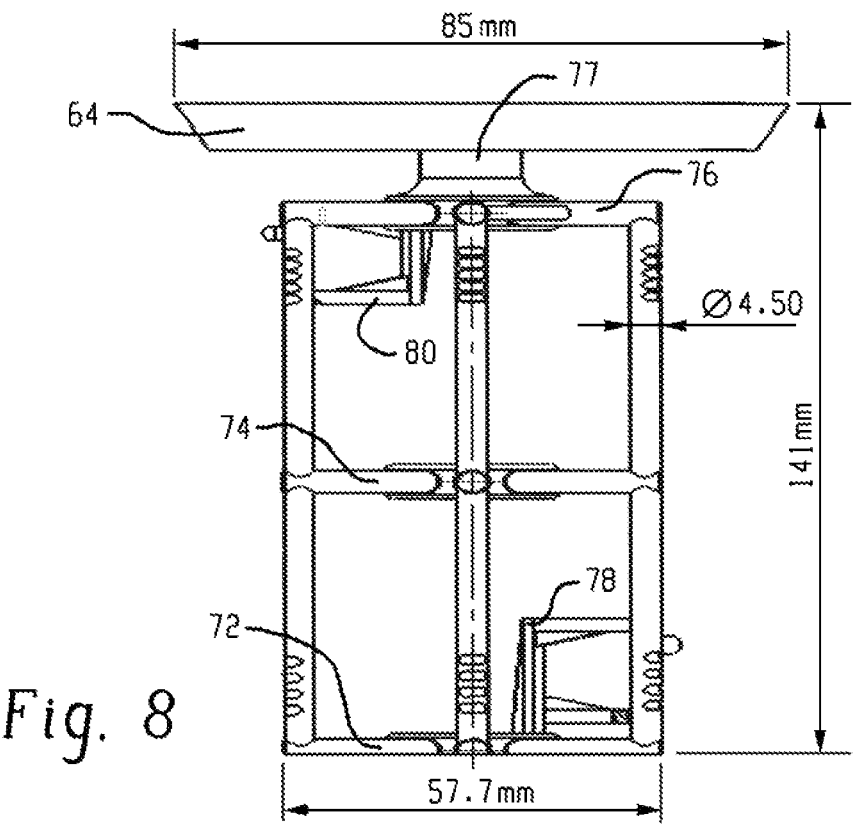
FIGS. 8 and 9 are exemplary dimensioned views of the scaffold of FIG. 2, the dimensions illustrating calculated routing lengths of a solution space wire and a vapor space wire.
Figure 9:
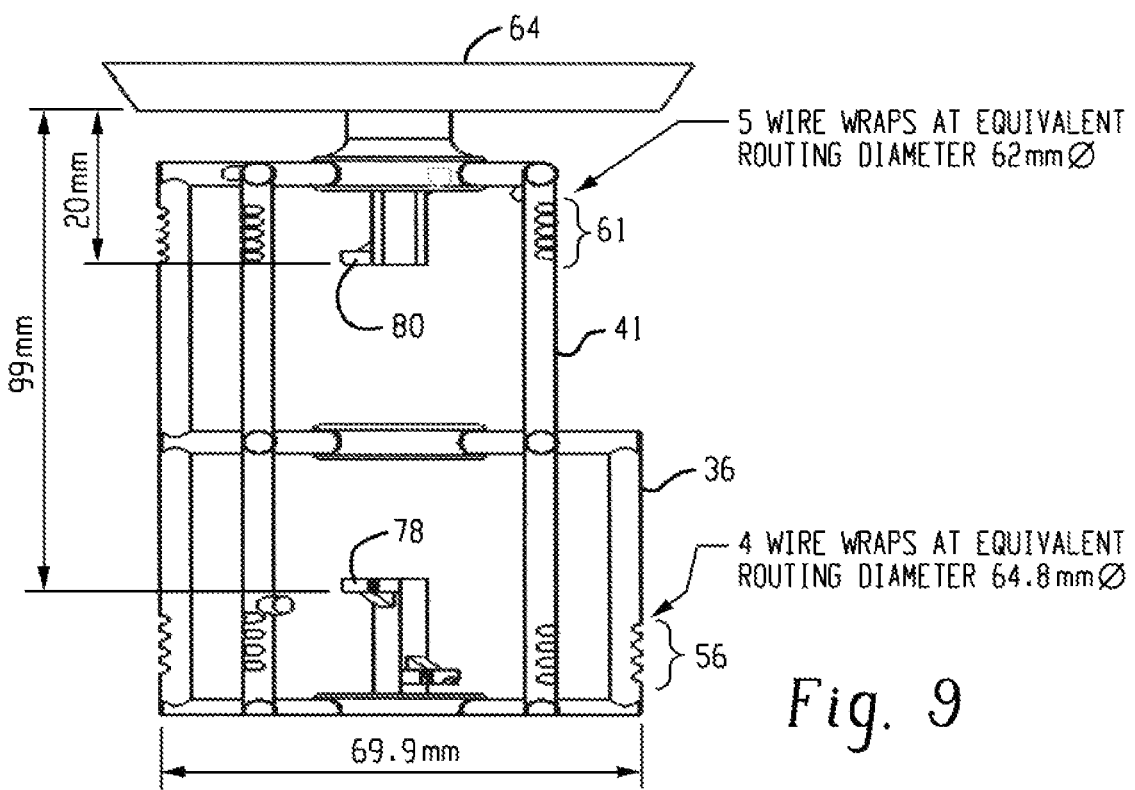

As illustrated in FIGS. 8 and 9, the sets of notches 53, 56, 61, 63 in the vertical support members 31, 32, 33, 34, 35, 36 and 41, 42, 43, 44, 45 provide a fixed length (approximate diameter) for each turn of the respective wire, which may be, for example, from 50-100 mm, such as 60-70 mm. Each set of notches may include from 2-10 notches, such as 4 or 5 notches, which cooperate to allow an (approximately) equivalent number of turns 51, 53 of the respective wire, while keeping each turn of the wire sufficiently spaced to minimize the chance of electrical contact and electrical field interference. In an example scaffold, there are five notches in each set 61, 63 in each of the upper support members, the notches being vertically spaced by 2.5 mm, and four notches in each set 53, 56 of the lower support members. In this embodiment, the fixed routing diameter provided by the upper notches is smaller than the fixed routing diameter for the lower notches, such that the length of each wire is approximately equal (wire length=$2\pi r + 2l$, where r is the radius provided by the notches and l is the length from the notches to respective connectors in the lid 64). For example, 5 notches with a routing diameter of 62 mm, which are spaced from the connectors in the lid by 20 mm, provides support for a second test wire 9 of 1013 mm in length, while 4 notches with a routing diameter of 64.8 mm which are spaced from the connectors in the lid by 99 mm provides support for a first test wire 8 of 1011 mm in length. This assumes that each wire 8,9 is kept under sufficient tension so that it does not sag. While the scaffold may be configured to support wires of equal length (e.g., within ±10 mm or within ±5 mm, or no more than ±1% or no more than ±0.5% difference in length). Having wires of equal length, as here, provides for easier calculation of wire resistance (or impedance in the case of an AC voltage or current source). In other embodiments, the first and second test wires 8,9 may be of different lengths.

Figure 10:
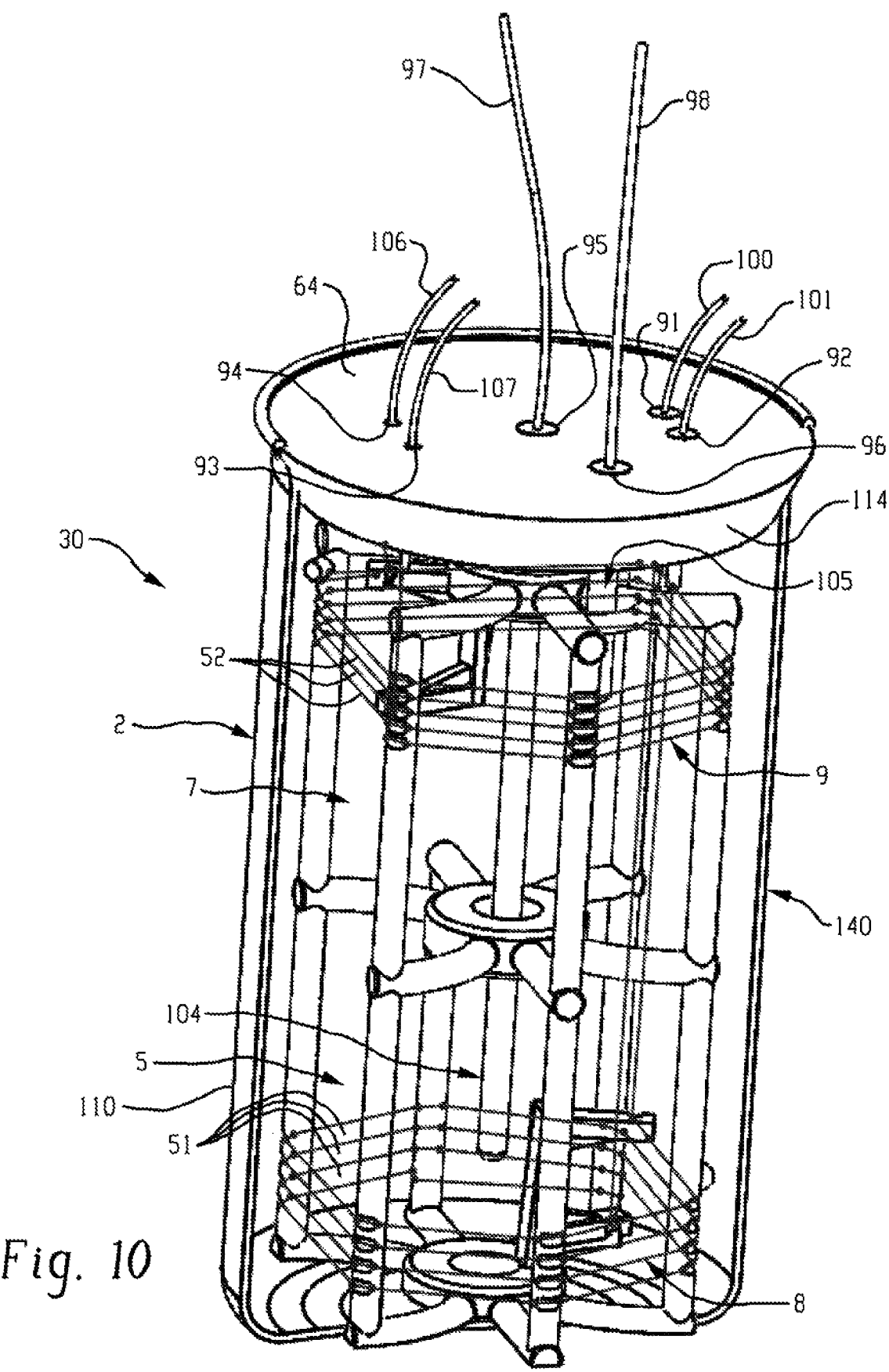
FIG. 10 is a perspective cross sectional view of one embodiment of the corrosion testing device of FIG. 1, including a first assembly of the scaffold of FIG. 2 with a routed and wrapped first test wire, and a routed and wrapped second test wire, and a housing, a solution space temperature sensor, and a vapor space temperature sensor.

As shown in FIGS. 5, 6, and 10, the lid 64 includes one or more feed-through holes 91, 92, 93, 94 which allow electrical connections to be made with respective ends of the test wires 8, 9 and respective external conductors 101, 102, 103, 104. In particular, feed-through holes 91, 92 provide for connections between the wire 8 in the solution space 5 and the first electrical source 12 and first voltmeter 10. Feed-through holes 93, 94 provide for connections between the wire 9 in the vapor space and the second electrical source 18 and second voltmeter 16. The holes may be fitted with push-in connectors which allow easy connection and disconnection between the test wires 8, 9 and their respective electrical sources and voltmeters. Additional holes 95, 96 may serve as electrical feed-throughs for connections 97, 98 to sensors, such as temperature sensors 104, 105, which extend into the liquid and vapor phases, respectively. The temperature sensors 104, 105 may be RTD temperature sensors. To allow the lid to fit snugly within the top of a housing 110 to form the vessel 2, the exemplary lid 64 includes a tapered rim 114.

Figure 11:
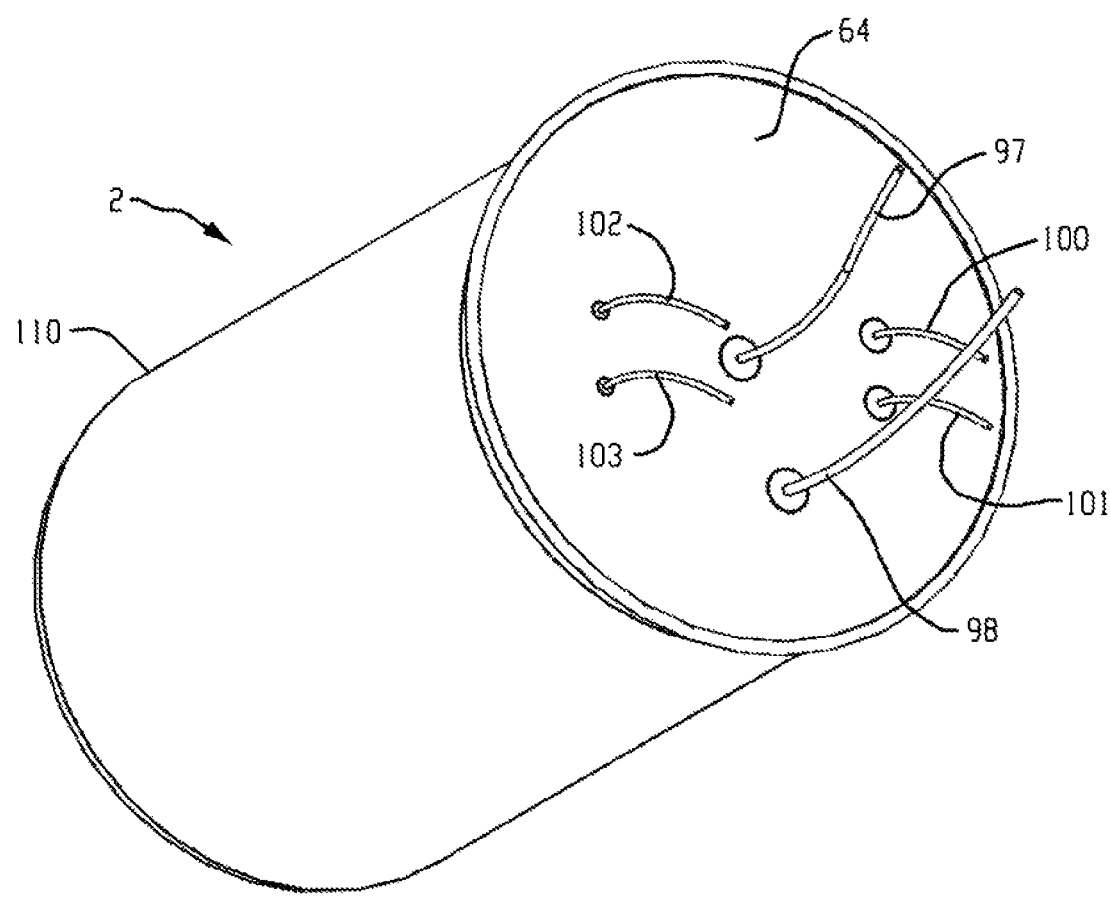
FIG. 11 is a perspective top view of the corrosion testing device of FIG. 10.

As shown in FIGS. 10 and 11, the routed and coiled first test wire 8, i.e., solution space wire, and routed and wrapped second test wire 9, i.e., vapor space wire are shown within the vessel 2, mounted to the scaffold 30. A first pair of external conductors 100, 101 connect ends of the solution phase wire 8 to the first power source 12 and first voltmeter 10. A second pair of external conductors 106, 107 connect ends of the vapor phase wire 9 to the second power source 18 and second voltmeter 16.

As illustrated in FIGS. 1 and 10, the testing device 1 may include a solution space temperature sensor 104, positioned to measure temperature of the solution in the solution space 5, and a vapor space temperature sensor 105, positioned to measure temperature of the vapor in the vapor space 7. The sensors 104, 105 are mounted within a housing 110 of the vessel 2, e.g., supported by the scaffold 30 and/or lid 64. The sensors 104, 105 provide temperature signals to the data acquisition device 24. For example, push-in connectors connect the sensors 104, 105 to external wires 106, 107 that are connected to the data acquisition device. While in the exemplary embodiment, connections are made through the lid 64, in other embodiments, the connections may be made through a cylindrical side wall of the housing 110 of the vessel 2. The fluid in the testing device 1 may be heated by a heater 112, such as an oil bath, glove box, or the like, which may heat the vessel 2 from the exterior. A single heater 112 may be large enough to heat several devices 1 concurrently. Alternatively, an internal heater, immersed in the liquid and/or vapor, may be used. The heater 112 may be under the control of the monitoring system 20. The bulk fluid temperature range for the solution phase and the vapor phase can be the same or different and may be in the range of from 20° C. to 300° C. The temperature of the surface of the wires 8, 9 can be significantly greater than the surrounding fluid 4, 6, due to resistive heating. In some embodiments, cooling of the surrounding fluid may be employed, to limit the wire temperature to a suitable range.

In combination, the scaffold 30 and wires 8, 9 form an assembly 140, which can be readily inserted, e.g., as a single unit, into the housing 110.

With reference to FIGS. 12-18, another embodiment of a scaffold 230, which is suited to use in the testing apparatus of FIG. 1, is shown. Scaffold 230 may be similarly configured to scaffold 30, except as noted.

Figure 14:
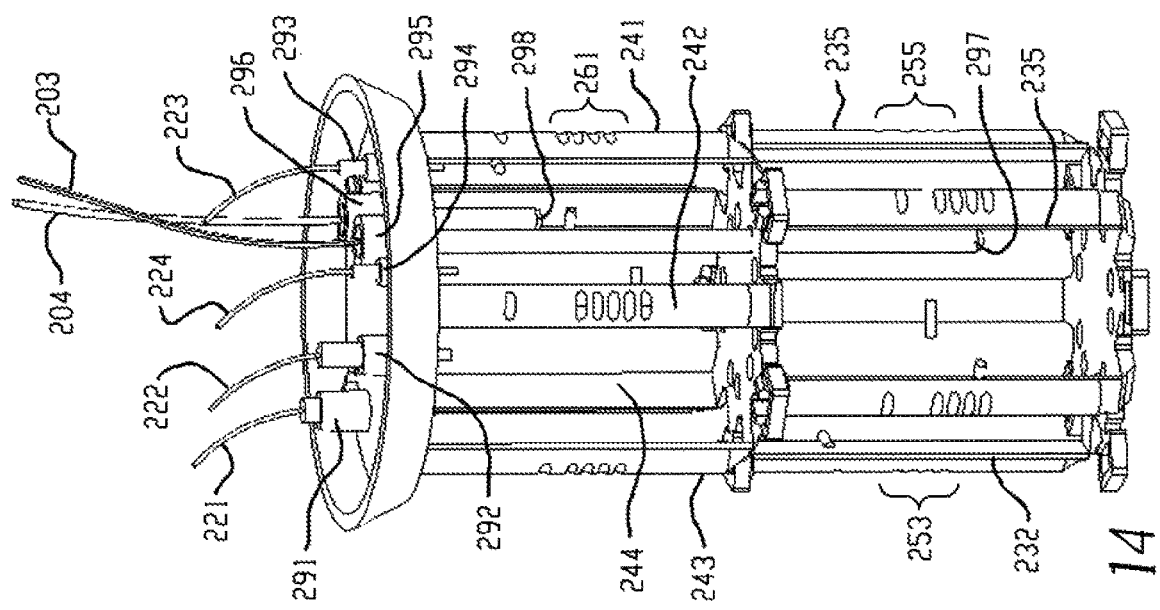
FIG. 14 is a second perspective view of the scaffold FIG. 12.
Figure 13:
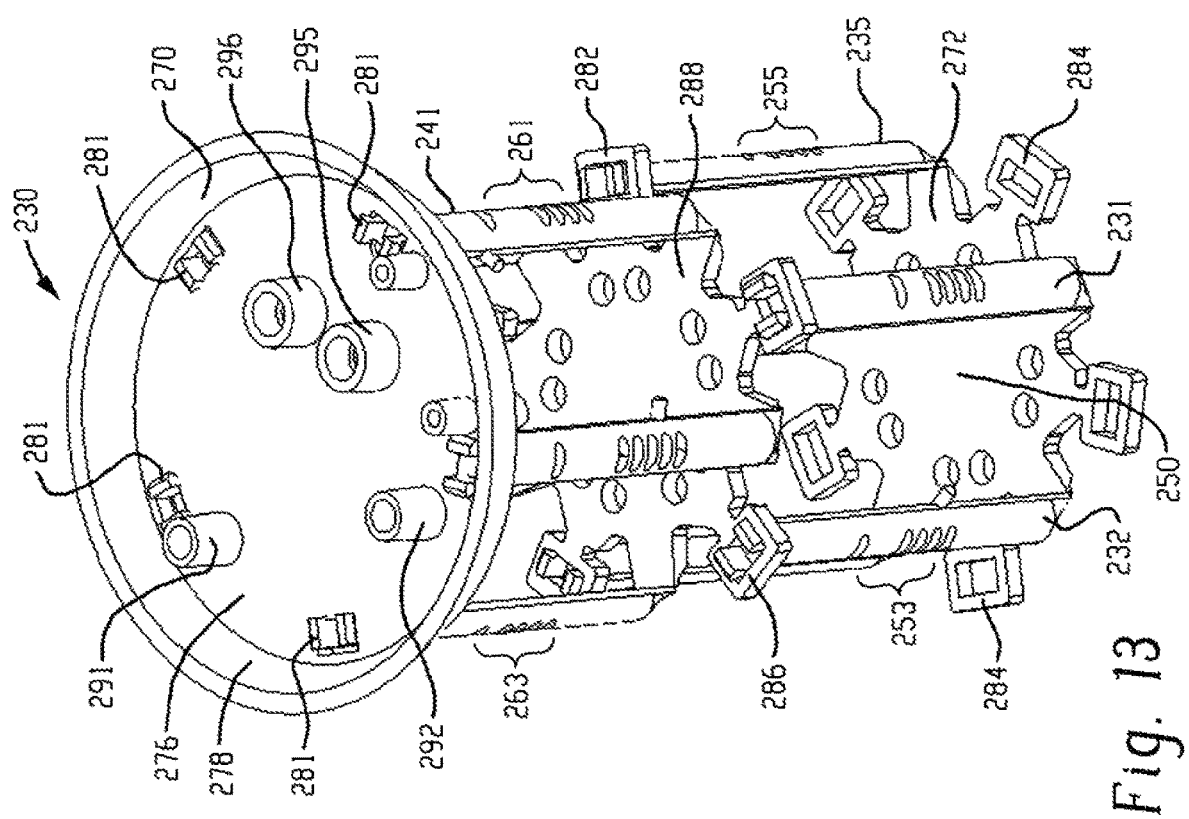
FIG. 13 is a first perspective view of the scaffold of FIG. 12.

As shown in FIGS. 13 and 14, the scaffold 30 includes a plurality of lower support members, such as 3, 4, 5, or 6 or 8 lower support members 231, 232, 233, 234, 235 (five lower support members are shown) define a solution space wire support 239 and a plurality of upper support members, such as 3, 4, 5, or 6 or 8 upper support members 341, 342, 343, 344, 345 (five upper support members are shown) define a vapor space wire support 349. The illustrated support members are curved, and have a width greater than their thickness, although cylindrical support members are also contemplated. The support members may be formed from an electrically insulative/non-conductive material, such as plastic (e.g., PTFE), glass, or ceramic, or from a mixture or combination of such materials. The lower support members are spaced from each other to define gaps 250 between the support members. The lower and upper support members each extend longitudinally and in parallel (e.g., within ±5° of each other). In the illustrated embodiment, the upper support members are equally spaced around the cross member 274 at 72° intervals and the lower support members are spaced equally around the cross member 272 at 72° intervals. However, the lower support members are offset from the upper support members by 36°, so that each lower support member is intermediate two adjacent upper support members. The scaffold 230 may be wholly or partially formed by 3D printing or injection molding, e.g., formed of plastic or other non-conductive material. In one embodiment, the scaffold is modeled in 3D using SOLIDWORKS and 3D printed using a SLS (Selective Laser Sintering) technique with nylon.

Figure 15:
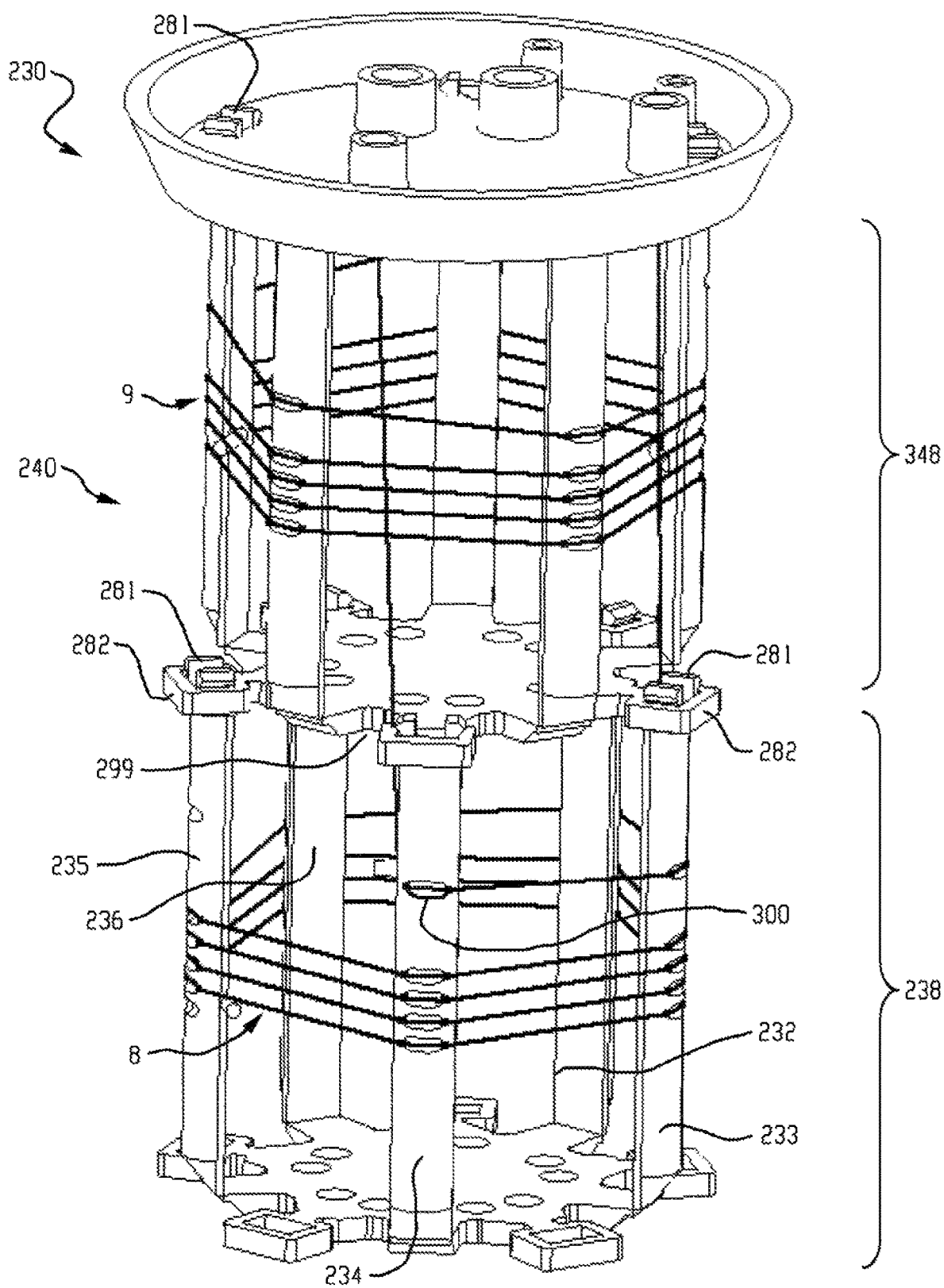
FIG. 15 is a perspective view of the assembly of FIG. 12.

The test wires 8, 9 may be supported in sets of spaced notches (or other routing supports) in each of the respective lower and upper support members to maintain the wire coils out of electrical contact. For example, sets 253, 256, etc. of solution wire (first) notches in an outer surface of the lower support members support the first test wire 8 and sets 261, 263, etc. of vapor wire notches in an outer surface of the upper support members support the second test wire 9 (FIG. 15).

Figure 12:
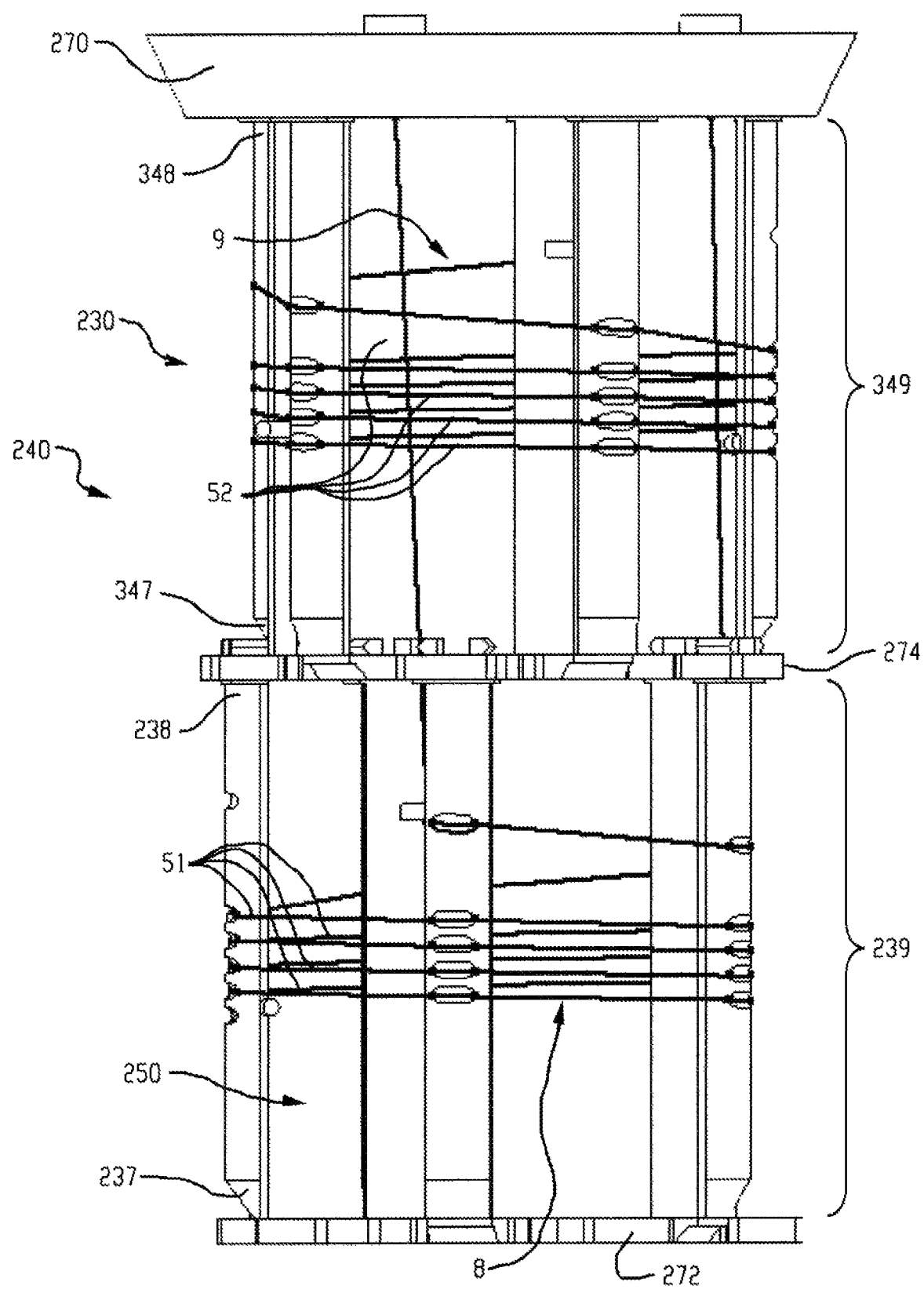
FIG. 12 is a front view of a second embodiment of an assembly of a scaffold suited to injection molding, supporting first and second test wires, according to another exemplary embodiment, which is suited for use in the testing apparatus of FIG. 1.

As shown in FIGS. 12-14, the scaffold 230 includes a closure member, such as a lid 270, and includes a lower cross member 272 and an intermediate cross member 274. In this embodiment, the lid 270 also serves as an upper cross member, although a separate upper cross member (not shown) may alternatively be employed, as for the embodiment of FIG. 10. The lid 270 serves to close the top of the vessel 2. The cross members 272, 274, and lid 270 serve to arcuately space the upper and lower support members. In combination, the scaffold 230 and wires 8, 9 form an assembly 240 (FIG. 12) which can be inserted into a vessel housing 110.

As illustrated in FIG. 13, the lid includes a circular base member 276, which is shaped to be received in the top of a container, and a tapered rim 278, which extends upward and outward from the base member. The base member 276 defines (five) arcuately spaced slots 280, one for receiving each upper support member. Upper ends 348 of the upper support members include snap-in connectors 281 which are received through the slots 280 in the lid 270 to attach the support members to the lid, e.g., removably. Lower ends of the upper support members extend upwardly from the intermediate cross member 274. Upper ends 238 of the lower support members include similar snap-in connectors which are received through respective slots 282 in the intermediate cross member 274 to attach the lower support members to the intermediate cross member 274, e.g., removably. Lower ends 237 of the lower support members extend upwardly from the lower cross member 272. The lower cross member 272 may include similar arcuately spaced slots 284 such that the intermediate and lower cross members are interchangeable and/or to allow for additional support members. The slots 282, 284 may be formed in flanges 286 which extend laterally outward from a generally circular middle portion 288 of the respective cross member 272, 274. In other embodiments, the lower ends of the support members may also be received in respective arcuately spaced slots, which are arcuately offset from slots 282, 284.

Figure 17:
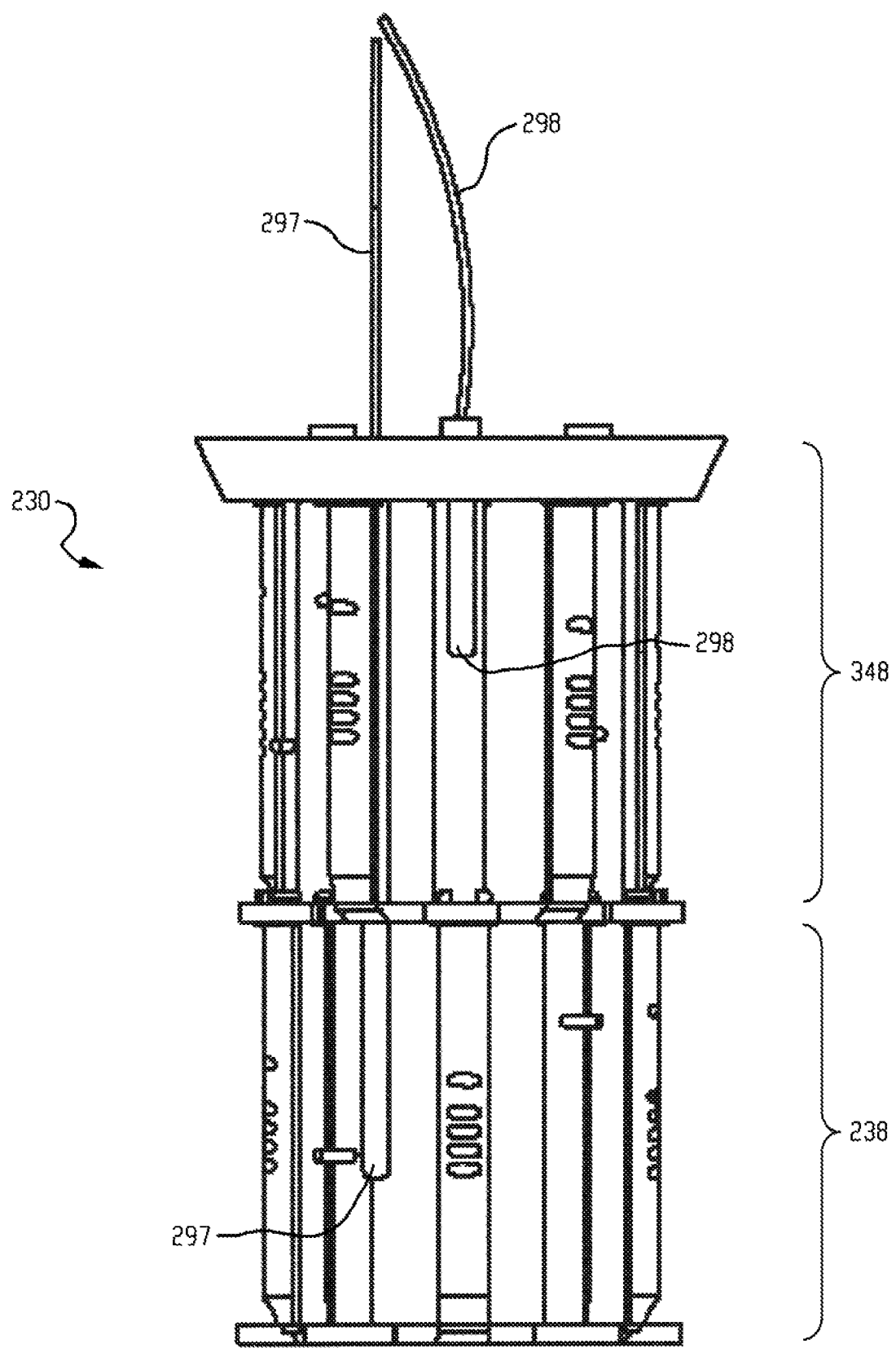
FIG. 17 is a front view of the scaffold of FIG. 12, with a solution space temperature sensor and a vapor space temperature sensor according to an exemplary embodiment of this disclosure.

The lid 270 includes one or more feed-through holes 291, 292, 293, 294 which allow electrical connections to be made with respective ends of the test wires 8, 9. In particular, feed-through holes 291, 292 in the lid base member 276 provide for connections between the wire 8 in the solution space and the first electrical source 12 and first voltmeter 10. Feed-through holes 293, 294 in the lid base member 276 provide for connections between the wire 9 in the vapor space and the second electrical source 18 and second voltmeter 16. The holes may be fitted with push-in connectors which allow easy connection and disconnection between the test wires 8, 9 and their respective electrical sources and voltmeters. Additional holes 295, 296 may serve as electrical feed-throughs for sensors, such as temperature sensors 297, 298, which extend into the liquid and vapor phases, respectively (FIG. 17). Differences in size and/or shape of the various holes 291, 292, 293, 294, 295, 296 ensure that a user makes the correct connections between the ends of the test wires 8, 9, and corresponding external wiring 221, 222, 223, 224, etc., via push-in connectors, and correctly positions the solution and vapor phase temperature sensors 297, 298 (FIG. 14). Connecting wires 221, 222 connect ends of the solution phase wire 8 to the first power source 12 and first voltmeter 10. Connecting wires 223, 224 connect ends of the vapor phase wire 9 to the second power source 18 and second voltmeter 16. The temperature sensors 297, 298 provide temperature signals to the data acquisition device 24, e.g., via external wiring. While in the exemplary embodiment, connections are made through the lid 270, in other embodiments, the connections may be made through a housing 210 of the vessel 2.

Figure 16:
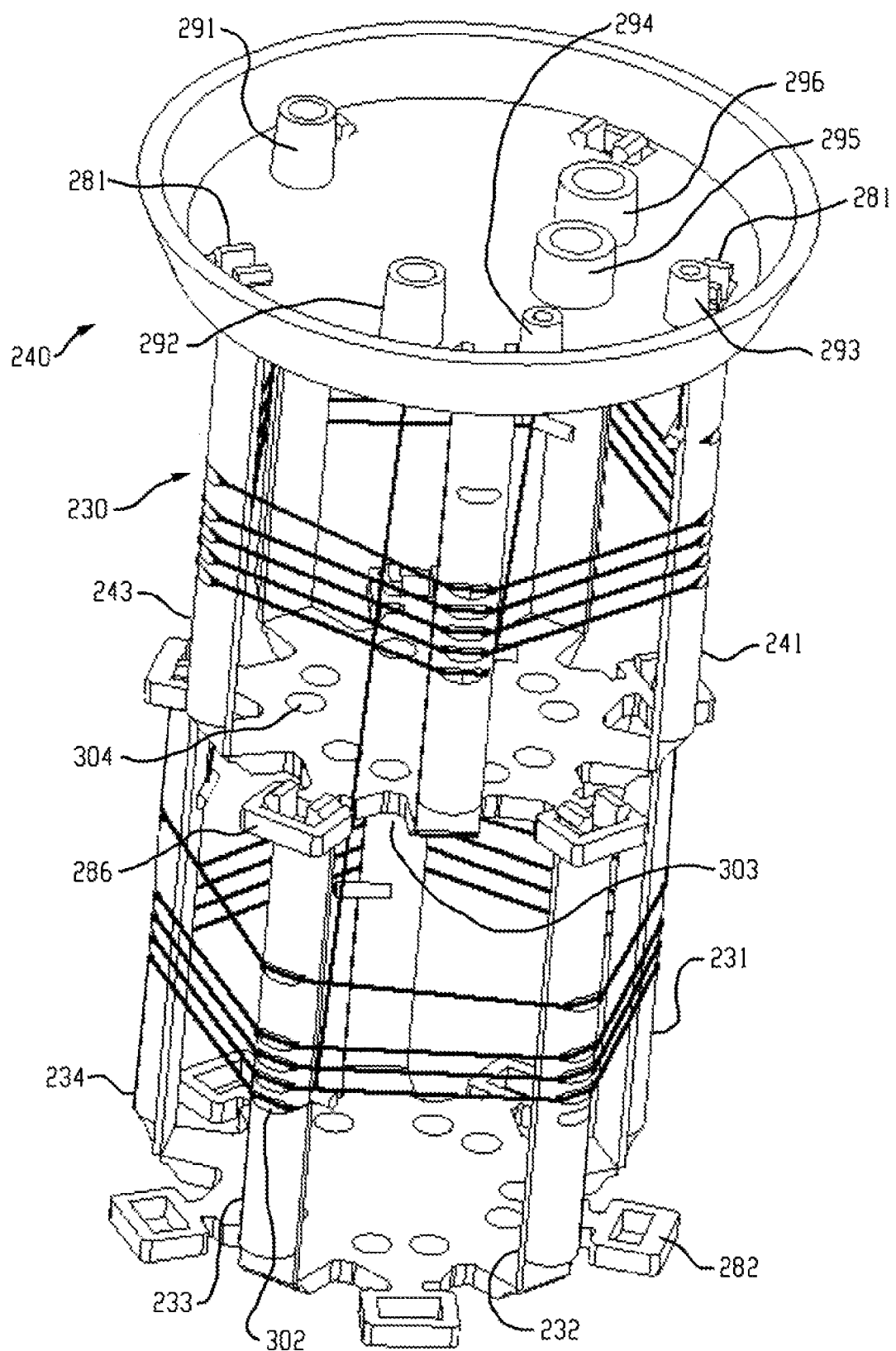
FIG. 16 is a second perspective view of the assembly of FIG. 12.

As illustrated in FIG. 15, the first test wire 8 is guided by a first groove 299 in the intermediate cross member 274, adjacent one of the slots 282, and passes through an aperture 300 in one of the vertical support members 234. The wire then coils around the lower support members, supported by the longitudinally spaced notches. As shown in FIG. 16, the wire 8 then passes through an aperture 302 in another of the support members 233 and is guided to the lid 270 by a second groove 303 in the intermediate cross member 274, adjacent a different one of the slots 282. Similar apertures may be provided in the upper support members to guide the second test wire 9. In another embodiment, spaced holes 304 in the crossmember(s) may be used as feed throughs to carry the wire 8. For ease of use, the upper and lower support members may be configured identically, with the same number of apertures and notches, so that they can be interchangeable. Additionally, at least the upper and lower ones of the notches in each support member may be shaped like an aperture so they can serve as either.

Figure 18:
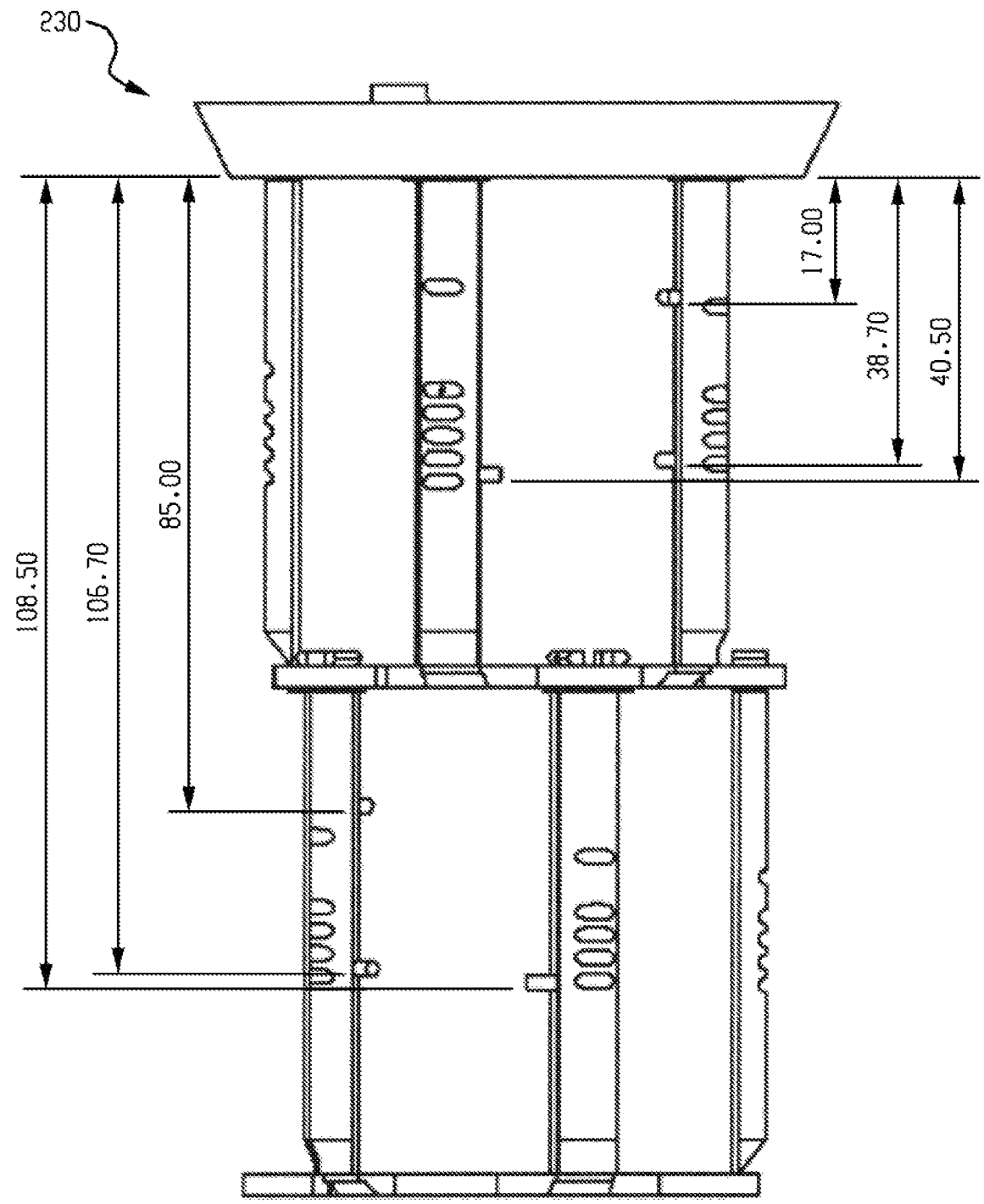
FIGS. 18 and 19 are dimensioned views of the scaffold of FIG. 12, the dimensions illustrating the solution space calculated wire routing length and a vapor space calculated wire routing length.
Figure 19:
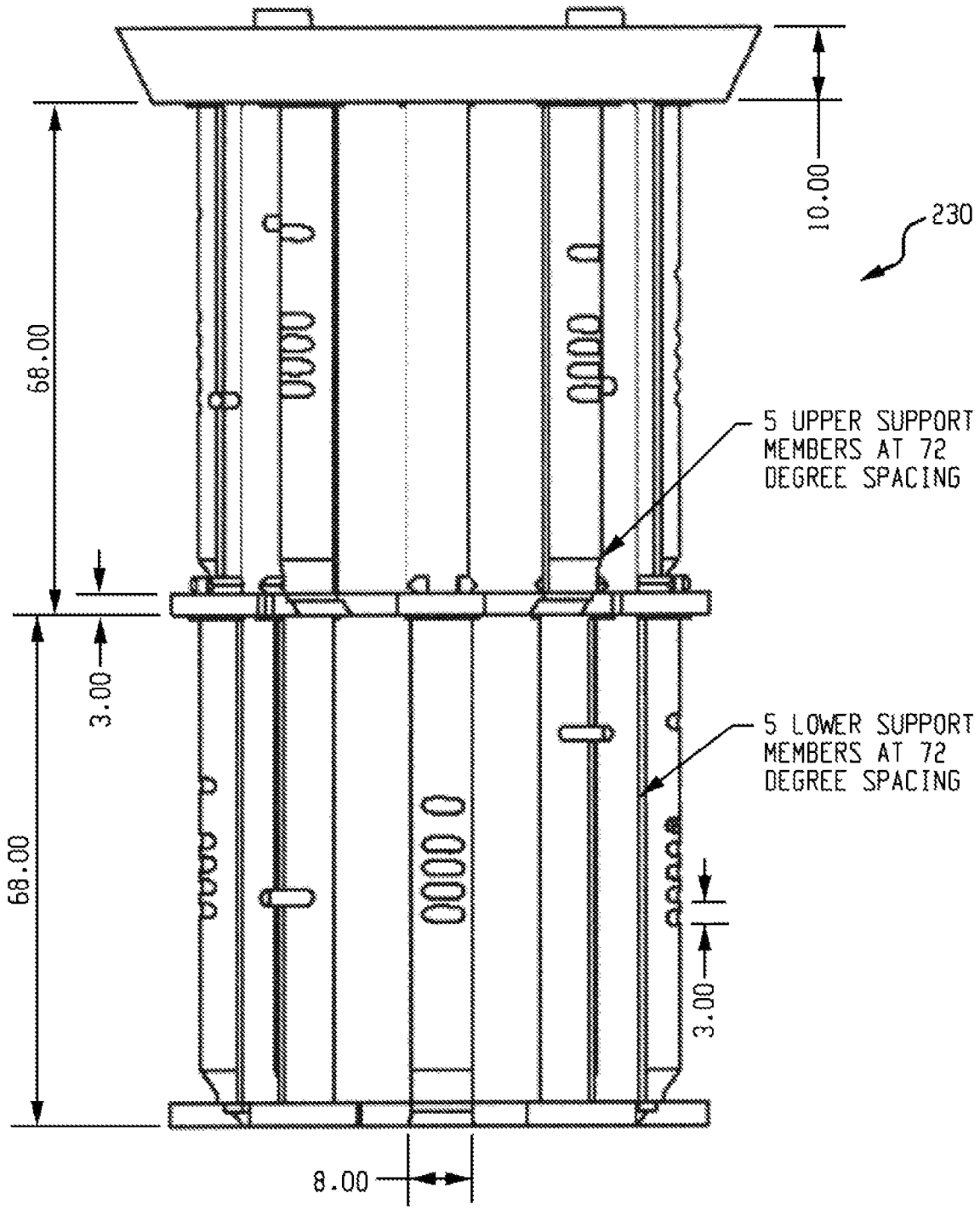
Figure 20:
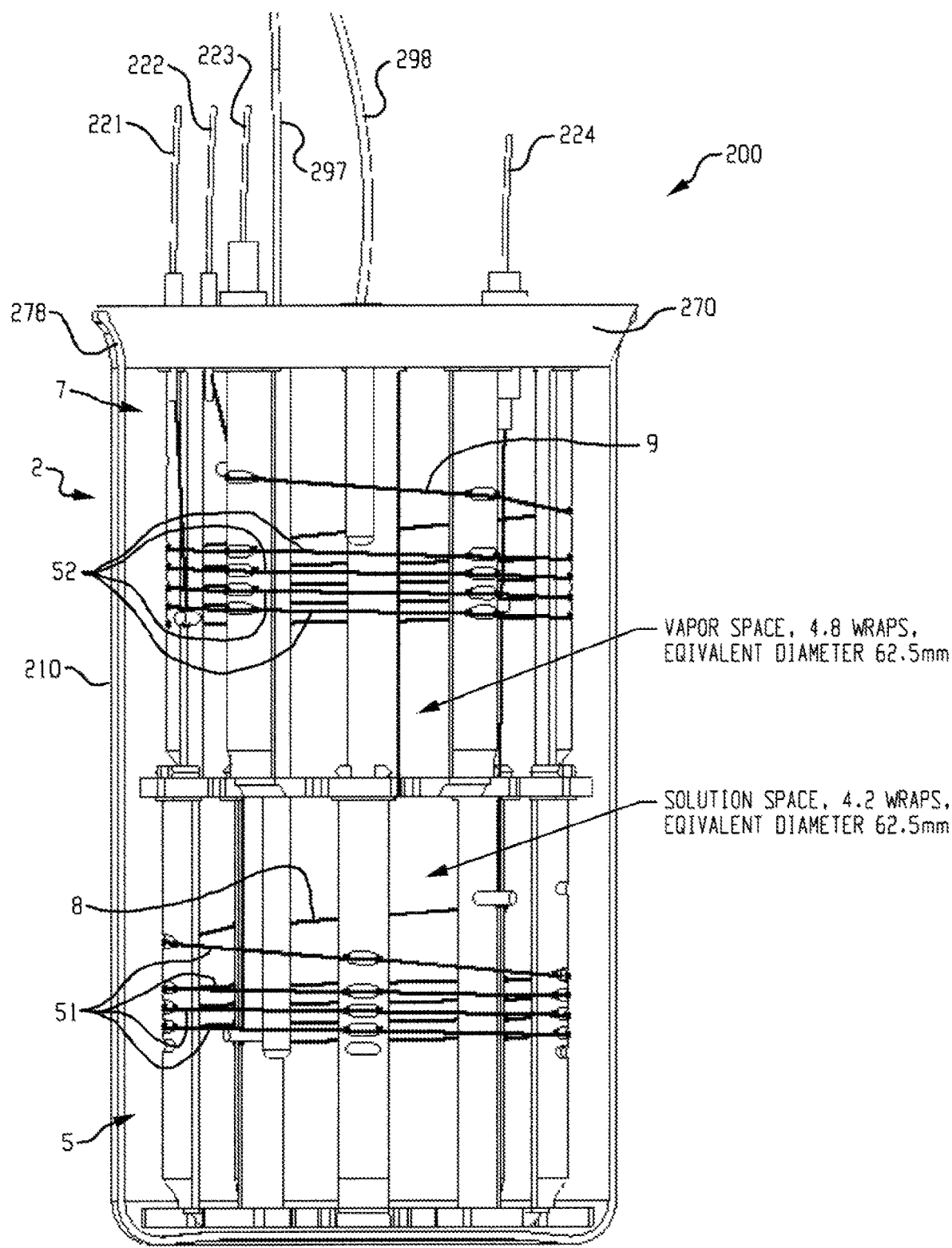
FIG. 20 is a perspective cross sectional view of a solution and vapor phase wire corrosion testing device including a housing, the scaffold of FIG. 12, wrapped wires, the routing of the solution space wire through a lid, and the routing of the vapor space wire through the lid, with exemplary dimensions.

As for the scaffold 30, the scaffold 230 provides for a fixed length of each wire 8, 9 (which may be the same or different lengths). Example dimensions (in mm) of the scaffold 230 are shown in FIGS. 18-20. In the example shown in FIG. 20, there are 4.2 wraps of the wire 8 in the solution space (with an equivalent diameter of 62.5 mm) and 4.8 wraps of wire 9 in the vapor space (with an equivalent diameter of 62.5 mm). Since the distance to the wire wraps from the solution space 5 to the lid 270 is slightly longer than for the vapor space 7, the test wires 8, 9 are thus of equal length (e.g., to within 5 or 10 mm).

As shown in FIG. 20, the assembly comprising the scaffold 230 and lid 270, with wires 8 and 9, routed and coiled around the scaffold, is inserted in the housing 210 to form a testing device 200. Temperature sensors 297, 298 may be fitted through the lid 270 before the insertion into the housing. The tapered rim 278 of the lid forms a tight seal with the housing 210. The fluid in the testing device 200 may be heated by a heater, analogous to heater 112, which may heat the vessel 2 from the exterior, or may be an internal heater, immersed in the liquid and/or vapor.

The exemplary testing apparatus thus includes a solution and vapor wire corrosion testing device 1, 200 fitted with wires 8, 9 that are formed from an electrically conductive material such as copper, with sufficiently small diameter and sufficient length to enable the detection of surface changes at the copper interface as the copper is reacted with (or passivated by) chemical attack, e.g., by additives within the lubricant solution and vapor phases. A thin copper wire (for example, 0.064 millimeters in diameter and 1 m in length) is generally suited to such measurements. The scaffold 30, 230 supports the wire and minimizes the tension in the wire. This can improve the accuracy and precision of resistance measurements of the wire for corrosion testing since tension differences can result in variations in the wire resistance and can contribute to inaccurate corrosion testing of the wire as the tension, and thus resistance, changes. The exemplary monitoring system 20 (FIG. 1) is configured to measure the resistance and voltage in such a relatively small wire accurately at elevated temperatures. The monitoring system 20 may operate as follows for estimating the rate of corrosion of the wire. The results can be used to assess the suitability of a particular lubricant (or lubricant additive) for use in a machine formed of similar metal(s) operating with the lubricant or, conversely, the suitability of machine parts for use with a lubricant. According to an exemplary embodiment, a fixed length and cross sectional diameter (e.g., of 1 m length and a diameter of 0.064 mm) copper wire used to obtain a wire size close to that used in automobile gearbox solenoid coils as well as providing measurement accuracy.

Figure 21:
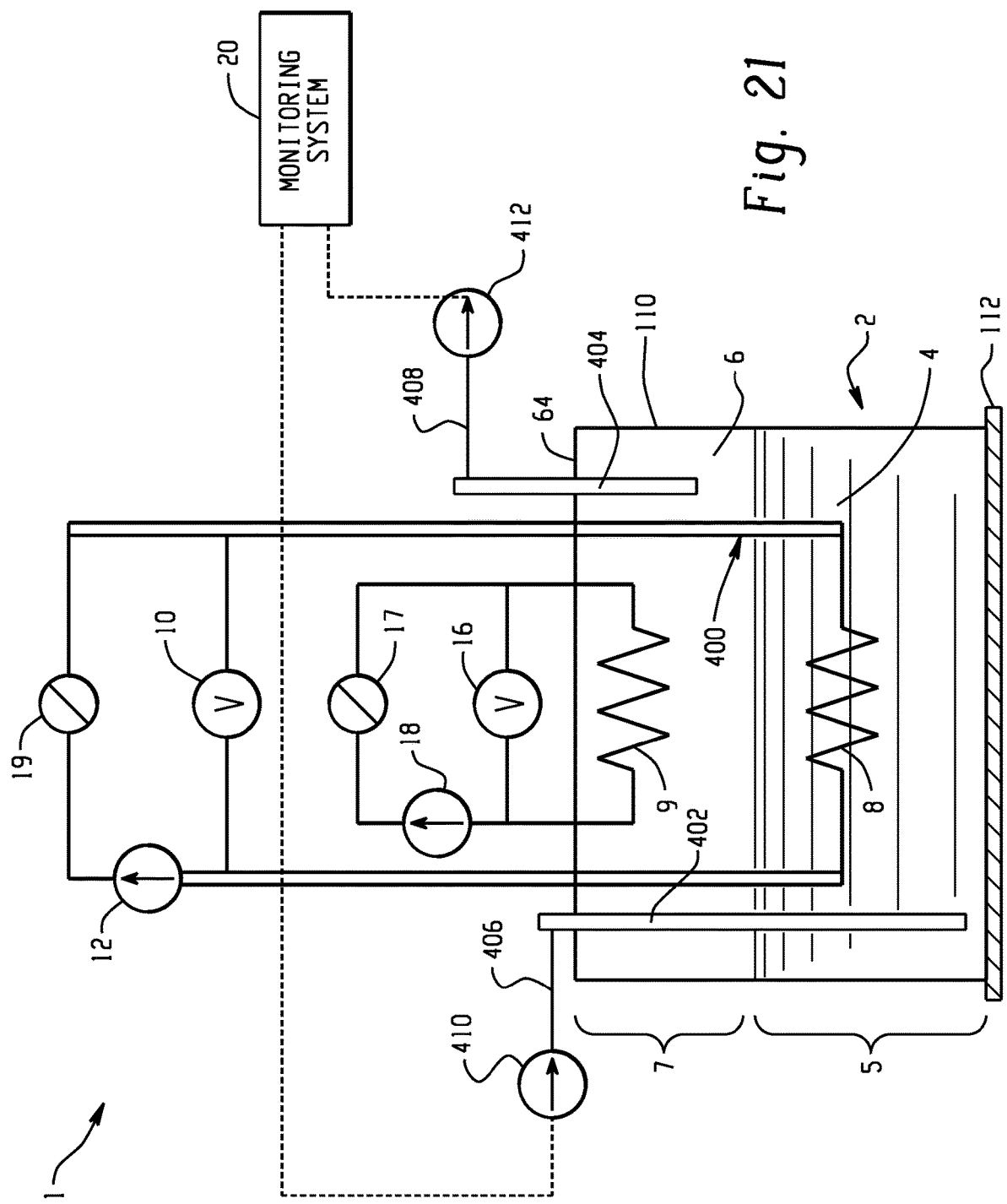
FIG. 21 is an electrical schematic of a testing apparatus including a solution and vapor wire corrosion testing device according to another exemplary embodiment.

With reference to FIG. 21, an electrical schematic of a testing device 1, which can be configured similarly to the testing device described above, except as noted, is shown. The testing device may be used in a testing apparatus as illustrated in FIG. 1. The testing device includes a sealed vessel 2, such as a beaker or other container. The vessel 2 holds a test fluid in a liquid (solution) form 4 in a solution space 5, and in a vapor (gaseous) 6 form, in a vapor space 7 of the vessel, which is above the solution space 5. The liquid is in contact with the vapor. A first electrically conductive test wire 8 (solution test wire) is at least partially suspended in the liquid 4. A second electrically conductive test wire 9 (vapor test wire) is suspended in the vapor 6, but not in the liquid 4. A first current source 12 is connected across ends of the first test wire 8 to supply an electric current through the first test wire. A second current source 18 is connected across ends of the second test wire 9 to supply an electric current through the second test wire. A first voltmeter 10 is connected across ends of the first test wire 8 to measure a voltage across the first test wire and a second voltmeter 16 is connected across ends of the second test wire 9 to measure a voltage across the second test wire. In another embodiment, components 12, 18 are current measuring devices, such as ammeters, and components 10, 16 supply voltages across the wires. In this embodiment, the voltage applied may be in the range of 5-800V. The current range depends upon the wire diameter.

In some embodiments, the first test wire 8 is fully immersed in the solution 4. This may be achieved by replacing the portion of the wire 8 extending into the vapor space with a larger gauge or shielded (e.g., coated) wires 400. In the case of a larger gauge wire 400, it may have a diameter (or mean cross-sectional area) which is at least twice, or at least three times that of the wire 8. As a result, corrosion predominantly occurs in the test wire 8. The wire 8 may be soldered or otherwise joined to wires 400 at ends of the wire 8. In the case of a coating, the vapor-phase portion of the wire 8 may be coated with a ceramic or polymer coating, or the like, which limits contact between the fluid and the portion of the wire 8 located in region 7, during the test. In this embodiment, only the unshielded/thinner wire portion is considered in determining the length of wire 8.

The wires 8, 9 may be supported on a scaffold (not shown), such as the scaffold 30 or 230, described above. Solution and vapor phase temperature sensors (not shown), analogous to sensors 104, 105, 297, 298, may be positioned in the vessel 2 to measure a temperature of the liquid 4 and vapor 6, respectively.

A first electrode 402 is suspended in the vessel 2 to contact the liquid 4. A second electrode 404 is suspended in the vessel 2 to contact the vapor but not the liquid. The first and second electrodes 402, 404 are connected with external conductors 406, 408, e.g., through the lid 64 of the vessel 2.

The electrodes 402, 404 may each serve as an anode or a cathode, depending on the direction of current flow between the electrode and wire. The first and second electrodes 402, 404 may be maintained at a constant or alternating potential difference with respect to the wires 8, 9, e.g., by one or more current or voltage source(s) 410, 412, such that a current tends to flow between the electrode 402 and adjacent first wire 8, and between the electrode 404, and the adjacent second wire 9, respectively. The current flowing through the solution (and vapor) between the electrodes/wires is able to cause electrolysis of one or both of the wires 8, 9, simulating real world conditions where stray currents may cause a loss in mass (or, in some cases, an increase in mass) of components through electrolysis. The electrodes 402, 404 may each be formed from an electrically conductive material, such as copper, silver, titanium, gold, nickel, platinum, zirconium, niobium, or tantalum, carbon/graphite, alloy thereof, or the like.

A monitoring system 20 is connected with the electrodes 402, 404. As for the apparatus of FIG. 1, the monitoring system 20 measures resistance (or impedance in the case of an AC source), or other electrical property of the wires, as an indicator of the change in mass of the wires 8, 9. In this case, the monitoring system 20 may also control the current/voltage applied to the electrodes 402, 404.

In the embodiment of FIG. 21, the measurement of the resistance change of the wire allows for quantification of mass change of the wire due to electrolysis as well as chemical corrosion. This embodiment allows for this process to be studied in detail at realistic operating conditions with realistic materials.

This configuration also for the probing of electrochemical reactions that would otherwise not occur without the applied power.

Figure 22:
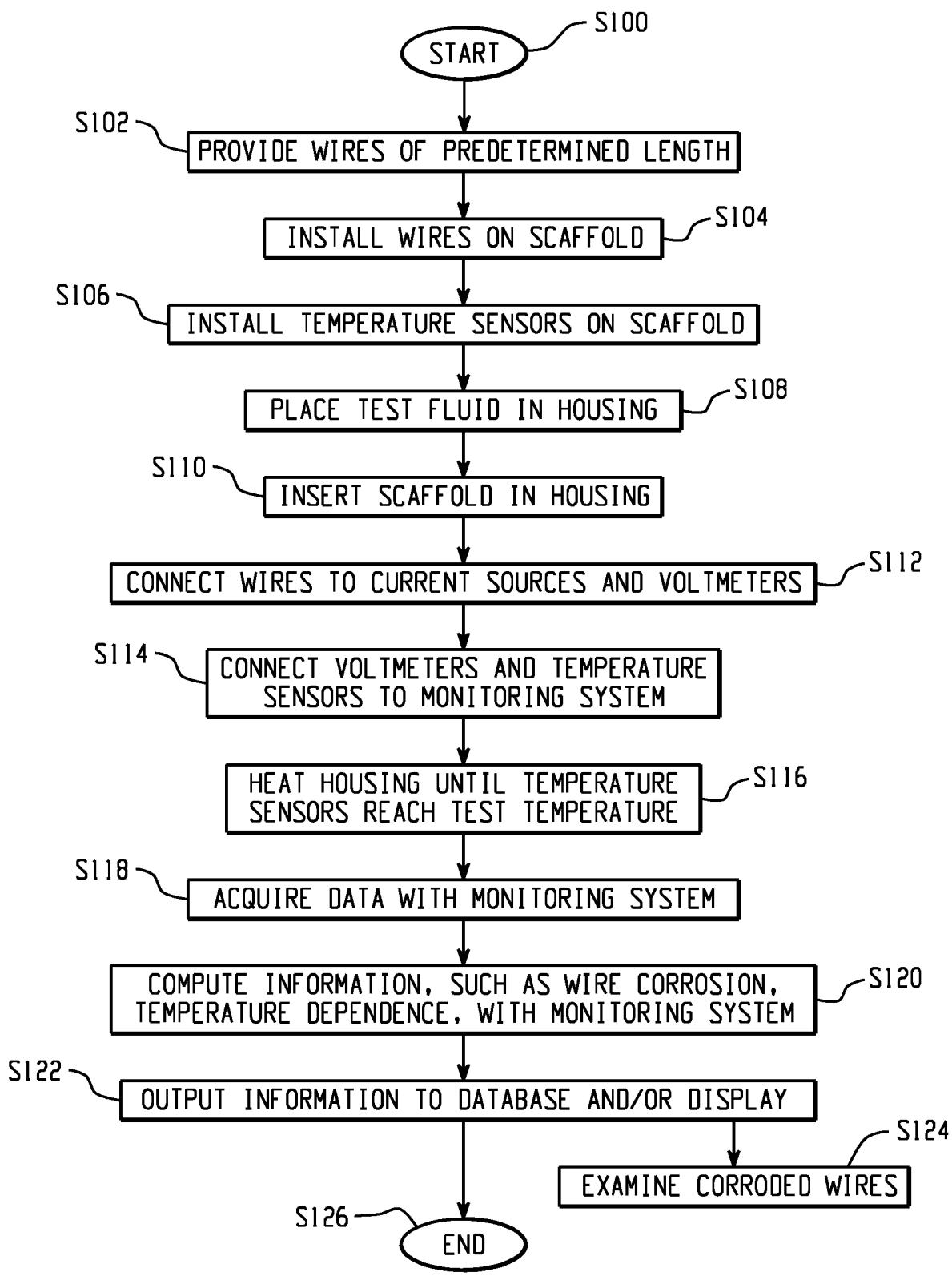
FIG. 22 is a flow chart illustrating a method which may be performed with the testing apparatus of FIG. 1.

FIG. 22 illustrates an example method which may be performed with the testing apparatus of FIG. 1. The method begins at S100.

At S102, wires 8, 9, e.g., of the same nominal dimensions and composition, are provided.

At S104, the test wires 8, 9, are mounted on a scaffold 30, 230, with ends of the test wires connected to connectors in the lid 64, 270. This includes coiling each wire a predetermined number of times around the respective solution space wire support 39, 49, 239, 249 with the test wires resting in the notches. S104 may be repeated for additional sets of wires and scaffolds.

At S106, temperature sensors 104, 105 are fitted through the lid.

At S108, a measured quantity of a test fluid, e.g., a liquid, such as a lubricant, is inserted into a housing 110. The quantity of the lubricant or other test fluid is sufficient to immerse a coiled part of the first test wire 8 in the liquid phase 4 of the test fluid, but to space the second test wire 9 from the liquid phase, so it does not touch it during a test. S108 may be repeated for additional housings and test fluids.

At S110, the scaffold 30, 230, with the test wires attached, is inserted into the housing 110, with the lid sealing an open (upper) end of the housing 110, 210. S108 may be repeated for additional housings and scaffolds.

At S112, the test wires 8, 9 are connected with respective current sources 12, 18 and voltmeters 10, 16 or, alternatively, with respective voltage sources and ammeters. Electrodes 402, 404, if used, may be connected with the power source 410, 412 through external conductors 406, 408.

At S114, electrical connections are made with the monitoring system 20. In particular, voltmeters 10, 16 (or ammeters) are connected with the monitoring system 20 for recording voltages (or currents) across/in the respective test wires 8, 9. The temperature sensors 104, 105 are connected with the monitoring system 20 for recording the temperature of the liquid and vapor phases 4, 6, respectively.

At S116, the housing 110 may be heated to heat the test fluid and create a vapor phase 6 above a liquid phase 4 of the test fluid. The heater 112 is controlled so that the temperature of the liquid and/or vapor reaches a selected temperature, as measured by the temperature sensor(s). Once at the selected temperature, the temperature is maintained throughout the test. Different housings may be heated to different test temperatures.

At S118, data is acquired with the monitoring system (e.g., temperatures of the liquid and vapor phases and voltages) for each of a set of times. Data from multiple test wires, e.g., four or eight test wires, may be acquired at the same time. In some embodiments, a relay control 17, 19 may be employed to switch between a powered state and a measurement state for determining the rate of corrosion of one or both wires.

At S120, information is computed with the monitoring system. This may include, at each time period, computing a resistance of each wire 8, 9, based on the set current and measured voltage (or vice versa). The resistances may be converted to a corresponding loss in radius (or diameter) of each wire, based on known properties of the wire. Comparable studies may be performed for each of a set of test temperatures of the solution and vapor. A relationship between a rate of corrosion (e.g., an average loss in wire radius per hour of the test) and temperature may be determined.

At S122, the computed information 22 is output, e.g., stored in a database, printed, and/or displayed to a user, e.g., in graphical or tabular form.

At S124 the tested wires 8, 9 may be examined under an SEM (Scanning Electron Microscope), which can be used to correlate a wire resistance profile of a fluid, including a solution space and vapor space, to the wire surface changes. By carefully controlling these conditions and data logging at a sufficiently high rate, the removal of bonding electrons from the metallic (e.g., copper) lattice is observed to increase the resistance of the wire as current flows through the wire indicating removal of metal from the surface, i.e., corrosion.

The method ends at S126.

Steps S116 to S122 may be performed automatically, by a computer processor, implementing software.

Measurement Theory for Corrosion

The principle theory behind the resistance measurement is Ohms law, which stipulates that Voltage (V) is equal to the Resistance (R) multiplied by the Current (I). Shown as a formula V=I*R, this formula can be re-arranged such that if the voltage and current are known, the resulting resistance can be calculated using the formula R=V/I.

By passing a known constant current or voltage through an electrical conductor such as a copper wire, and measuring the resultant voltage or current respectively, the resistance can be calculated. This is the principle by which both standard resistance measurements and Platinum Resistance Thermometers (PRT) work. The relationship of temperature to resistance is the foundation of how Platinum Resistance Thermometers (PRTs) work.

In the exemplary setup, a constant current source 12, 18 is employed, for the test wires 8, 9, as this limits the effect of self-heating which can become a large enough effect as to produce visible offsets in the measurement when current is passed through a wire. Resistance measurements are directly affected by and thus related to changes in temperature of the conductor being measured.

Measurements

The exemplary monitoring system 20 may include one or more computing devices with memory storing instructions for performing the data acquisition, data analysis, and data storage, as well as the acquired data and processed information 22.

According to an exemplary embodiment, the data analysis component 26 includes a FLUKE 8846A™ High Precision Digital Multimeter (DMM) to measure the resistance of a copper wire at the start of the test; end of the test and at periodic points throughout the test. The 8846A DMM is a 6½ digit device with a maximum resolution of 14 μΩ (10 micro-ohm) which is a United Kingdom Accreditation Service (UKAS) calibrated measuring device. For each measurement, the DMM and copper wire are allowed to stabilize in a temperature controlled room stable to within a band of 19-21° C. and then the measurement is taken. This is desirable since the resistance is directly related to temperature. Thus, to acquire an absolute change in resistance, measurements are taken at the same temperature every time. This is further described below.

Whilst the FLUKE DMM is very accurate and provides suitable initial data, it is not suitable, nor designed to be run continuously in a potentially corrosive laboratory environment. In addition, the device is limited to a single channel with no specific logging capability for the generated data.

Consequently, a data acquisition and logging device 24 may be used to provide accurate measurements on multiple channels based on the resistance measurement theory previously discussed.

The data acquisition component 24 of the monitoring system 20 may include an amplifier module that provides an extremely accurate 1 mA/100 µA excitation current. A suitable amplification module is an NI-9226, available from National Instruments. The NI-9226 is an 8-channel PT1000 module with a measurement range of 0-4,000 Ohms.

Data sampled by the data acquisition device 24 is raw measured resistance; this resistance can be converted to resistance at a nominal temperature after the sampling has taken place, if desired. The exemplary amplifier module is used in the resistance range of the solution phase and vapor phase copper wire and may log up to eight or sixteen channels of data simultaneously.

For the temperature measurements, an NI-9216 8-channel PT100 platinum resistance thermometer (PRT), also available from National Instruments, may be employed. Such temperature sensors 104, 105 have a measurement range of 0-400 Ohms. Both the NI-9226 and NI-9216 models have the same temperature measurement range of −200° C. to +850° C. To allow for the number of desired measurement channels, two of each module may be installed in a 4-slot chassis, thus all four slots of the chassis are utilized. Both modules are operatively connected to a suitable data acquisition chassis then programmed to read, log and control, as desired. The programming of the modules/chassis can be performed using LabVIEW™ software, which is National Instruments' proprietary data acquisition software. Suitable chassis are available in one, four and eight slots and are available in USB, Wireless and Ethernet connectivity forms amongst a few others.

According to an exemplary embodiment, a four slot Ethernet chassis is used to allow for a maximum of sixteen resistance measurements, i.e., 2×8 channels, to be conducted simultaneously utilizing a large enough heating bath 112 to control the temperatures of a plurality of solution and vapor phase wire corrosion testing devices 1, 200. Ethernet communication may be used to provide communications from a laptop computer or other computer device to connect to multiple chassis from one central location.

In one embodiment, the data analysis component 26 converts the measured resistance of the test wires to a diameter of the wire. A change in resistance indicates a change in wire diameter (or radius), which may be assumed to correspond to a rate of corrosion of the wire.

The relationship between resistance and wire diameter/radius can be determined by making diameter measurements on wires 8, 9 that exhibit different resistances in the test. For example, the wire diameter measurements are made by sectioning the wire and examining the cut faces under a microscope.

Initial tests are performed in a temperature controlled room using the Fluke DMM. As the tests begin to transition onto the USB DAQ chassis, accuracy tests are performed to compare the accuracy of the two acquisition components side-by-side.

There can be different monitoring system setups, depending on accuracy requirements. A 4-wire setup is highly accurate as it accounts for measurement lead resistances by using two signal wires which are fed into two very high impedance inputs which effectively draw zero current, resulting in substantially no voltage drop or generation when measuring the voltage differential across the wire resistance under test. Consequently, the voltage generated is the absolute voltage of the resistance.

It is also common practice to zero the excitation leads and associated connectors because the leads have a resistance of their own and if they are not accounted for the voltage produced across them will be added to the voltage differential across the resistance under test. To zero the leads and connectors they are connected together as close as possible. Any voltage differential measured by the signal input wires is due to the resistances of the leads and connectors which is then stored in the software and used as an offset. This value is negligible and in the 1-5 mΩ (milli-ohm) and the larger the test wires, the lower the resistance thus a lower offset voltage proportionally.

One of the factors that affect the measurement readings is the offset in environmental temperature from when the initial start of test (SOT) reading is taken as well as the amount of time that the measuring device and sample are given to stabilize. As resistance is directly related to temperature regardless of the mechanism used to measure it, any difference in temperature between two measurements will give a different resistance measurement, thus for measuring an absolute change in resistance, all parts of the testing apparatus are allowed to stabilize to the same conditions as the first measurement, for example 12 hours in a temperature controlled room. Any other measurement is relative to the environment to which it is subjected as well as the conditions when the SOT values are taken.

Software Systems

In one embodiment, the monitoring system employs the following software systems:

CATS=Corrosion Analysis Tool & Services: A combination of three different programming languages are utilized to enable the wire corrosion test to be automated and reduce complexity for the operator, namely:
LIMS (Laboratory Information Management System) (Optional) is a Laboratory Information Management System;
CATS Client was developed in LABVIEW™;
CATS Eye was developed in SHINY, which is a product of RST This combination of applications is critical to data processing, interpreting and reviewing the generated test results. The CATS Client application is responsible for hardware control and data acquisition. LIMS is responsible for sample management and uploading of results as well as providing test specific information for CATS Client. CATS Eye application is responsible for normalizing and checking the data, generating reports (including plots) and enables users to explore data and generate own comparisons.

Sample Management

LIMS Export for CATS Client: CATS Client is configured to take a standard CSV file from a LIMS solution if required. This is to drive the automatic loading of samples to be tested into the software interface. LIMS provides management of a testing space, sample backlogs, definition of tests, calculations, validation, integration with $3^{rd}$ party software and uploading of data. A filename is created by the LIMS system, including a batch id as follows: The instrument in LIMS (instrument as in CATS Client instance) with no spaces, the unit name with no spaces, the worklist number and <t> the temperature of the unit; and .csv is fixed.

The CSV format and summary of the identifiers sent from LIMS to CATS Client are as follows:
The first column in the CSV file is the Parent Run Id;
The second column in the CSV file is the Sub Test Run Id; and The third column in the CSV file is the internal material name, e.g. SAMPLEIDENTIFIER1, SAMPLEIDENTIFIER2, SAMPLEIDENTIFIER3, etc.

The first row of the file is a control standard which is selected as the first run in the LIMS application.
PARENTRUNID,SUBTESTRUNID,SAMPLE
SAMPLE1,SAMPLE2,SAMPLE3

Note that when CATS Client reads the file, each of the sample rows provided, except the first sample, which is a control run, are doubled in the CATS Client interface. This is to represent the sample running in solution and vapor. Each run expects two results rates from CATS Eye, one for solution and one for vapor.

LIMS Imports From CATS Client

Once the raw data file has been produced from the CATS client after the test has completed, a CSV file is produced.

In an exemplary monitoring system, the CSV file is used to operatively connect and integrate the CATS Client and CATS Eye.

In an exemplary monitoring system 20, an SQL (Structured Query Language) database is used by the LIMS. In that database are created batches and solution and vapor wire corrosion testing device tables to hold the imported data. This is a temporary location to provide a connection between CATS Client and CATS Eye rather than moving CSV files across the network.

According to another exemplary embodiment, data is permanently stored in a row-based structure for cross sample analysis to enable plotting of historical results. By default, once a batch is created it marked as unavailable for CATS Eye to extract.

Full Data Import

In an exemplary monitoring system, the data is imported into a series of tables to hold all the configured wire corrosion testing device results for vapor and solution. Every row over the duration data of the test is imported into a table and is accessible by CATS Eye via the batch id. According to another exemplary embodiment, the data is processed in memory and not stored in a database.

Down Sampling

The LIMS import process also imports rows of data from the raw CSV file at given down sample rates. This is configurable in LIMS and defaults to every 1000 rows if a value is not provided. The structure of the down sampled data provides access to do cross sample analysis.

According to one exemplary embodiment, once a batch has been imported successfully into the database, the batch is marked as available so CATS Eye can extract data from the table. According to another exemplary embodiment, the data is instantly processed and available for download.

CATS Eye Imports

The internal CATS Eye implementation provides a rates CSV file containing a rate result for vapor and solution. These are read from the CSV file into LIMS and uploaded as a measurement result.

Rate Results

The solution and vapor wire corrosion testing device rate file may contain the following columns: Run Id, Fluid ID (Sample Number), SolFittedCRC, SolTime, SolRate, VapFittedCRC, VapTime, VapRate.

According to an exemplary embodiment, an internal LIMS solution maps the rate values from the file to the relevant run id(s) in the selected unit for import. These results are mapped through LIMS and uploaded to a database for viewing. According to another exemplary embodiment, an external implementation will simply provide a downloadable PDF and CSV file.

CATS Eye PDF Results

The internal CATS Eye implementation provides a set of PDF files for each sub test run. These documents are located on a network share and attached to each sub test run as a supporting document.

Data Acquisition and Local Storage

As previously described, the software used to program and run the test is LabVIEW™ which is a graphical based software programming language rather than a classical text-based language. The software has undergone major revisions in its capability and user interface whilst maintaining a simplistic yet powerful approach to testing such a niche application. A comprehensive list of the functionality supported in the current revision, v3.0 is as follows:

1) Select and connect to an online networked chassis, either link-local or DHCP.
2) The ability for the test to display a confirmation dialogue box should an incorrect network hardware device be selected.
3) The ability for the test to display a confirmation dialogue box should the number of specified channels for resistance not match the number of specified temperatures channels as per the .ini settings file.
4) The ability for the test to display a confirmation dialogue box should the number of physical hardware channels not be sufficient for the number of channels specified in the LIMS .csv file.
5) The ability to fully stop a test and connect to a different chassis without quitting the application.
6) The ability to fully stop a test, reload the same test or an alternative test and continue from the last data log point.
7) The ability to reload a test and continue from the last data log point following a failure (including power failure) of the LabVIEW hardware, network connection or laptop.
8) Dynamically change the number of displayed channels to that specified by the LIMS .csv file.
9) Dynamically change all button text to show the relevant descriptions.
10) Dynamically enable/disable buttons to ensure safe and correct operation.
11) Dynamically log the correct number of channels based on the LIMS .csv file even if more hardware channels are specified in the .ini settings file than required.
12) The ability for the operator to specify the automatic logging rate at any desired interval but with a minimum of 60 seconds/1 minute.
13) Automatically split each logging file into file sizes specified by the operator in the settings file.
14) Allow a new test to be created or an old test re-loaded and resumed.
15) The ability to disable and enable logging in test.
16) The ability to pause a test or fully stop a test without quitting the application.
17) The ability to pause a test with the option of resuming with logging enabled or disabled.
18) The ability to manually log data to a separate log file on demand.
19) A separate summary file to log all test specific data, events and occurrences that happen in test.
20) On screen indication of the specified test data.
21) On screen indication of the type of test being run, if any.
22) On screen indication of the number of logs to the test data files.

23) On screen countdown as to when the next automatic log is to take place.
24) On screen indication of the selected logging interval.
25) On screen indication of the test started date/time.
26) On screen indication of the total test elapsed time.
27) On screen indication of the current date, time and temperature.
28) On screen Logging active indicator.
29) On screen indication of the hardware attributes for the connected network device.
30) On screen indication of the number of network connection retries allowed.
31) On screen indication of the number of network connections currently performed.
32) On screen indication that the network device successfully connected.
33) On screen indication of the current resistance, start of test resistance, percentage change and temperature for each channel.
34) Open circuit detection with on screen indication and logging to summary file for each channel.
35) Messages based state machine test sequencing for correct test setup and initiation by the operator.
36) The ability to zero the connectors and leads to remove offset errors
37) Allow for stabilization times to be applied per sequence step with an on-screen countdown.
38) The ability to skip the stabilization countdown once started should it no longer be required/desired.
39) The ability to cancel the test sequencing at any point and return to the start of the test.
40) The ability to define all hardware and many of the test specific settings via an .ini settings file.
41) The ability to specify the hardware channel type, physical slot, physical range, units, calibration data, channel setup data and read range in a .ini settings file.
42) The ability to specify if the log data path is absolute or relative.
43) The ability to specify the log data path for absolute in a .ini setting file.
44) The ability to specify the path for the LIMS Export for CATS in a .ini settings file.
45) The ability to specify the path for the LIMS Import from CATS in a .ini settings file.
46) The ability to specify the maximum file size per data log file in a .ini settings file.
47) The ability to specify the hardware sample rate in a .ini settings file.
48) The ability to specify the sample read rate in a .ini settings file.
49) The ability to set the open circuit resistance limit value in a .ini settings file.
50) The ability to specify the display update rate in a .ini settings file.
51) The ability to specify the display screen resolution in a .ini settings file.
52) The ability to specify the sample read timeout value in a .ini settings file.
53) The ability to specify the number of network device connection retries in a .ini settings file.
54) The ability to specify the hardware clear task time value in a .ini settings file.

Upon execution of the application, the main screen is presented with all controls and indicators set to their relevant states such that the only allowed task at this point is to attempt connection to the desired networked chassis. The user presses a button to toggle to the relevant connection screen whereby they chose from a drop-down menu that contains discovered network devices, i.e., devices that have been correctly setup, are present in the monitoring system and in a state that they can be connected to. Once the desired chassis is selected, a reserve button is pressed to initiate the connection. The system will attempt to connect to the chassis for the number specified in the .ini file settings. The current connection attempt number is displayed on the screen.

If the connection is successful, the device attributes will be displayed on the screen as well as an indicator light to show the chassis has been successfully connected to. Following a successful connection, the control and indicator states will also change states to allow the test to move forward which include the ability to create a new test or load a previous test in order to continue from the last logged data point. Only if a test is not running can the current reserved chassis be unreserved.

If the connection is successful, a logical check is performed to ensure the number of resistance channels match the number of temperature channels. If it does, the test continues, if it does not, a confirmation dialogue box is presented to the operator stating the exact number of channels for each. The only option presented is a button that quits the application as the settings file needs to be amended to ensure the channel counts match.

Following a successful connection, if a new test is chosen the data entry screen is presented to the operator. As previously mentioned, the LabVIEW system reads in the test specific sample information via a standard csv-based file that is generated by LIMS. This file is selected by the operator in the data entry settings screen. Upon choosing the LIMS file, logical operation checks are performed to ensure that the number of channels requested in the LIMS file can be ran based on the total number of hardware channels currently setup in the task. If there are enough, the test continues unimpeded, however if there are not sufficient channels, a dialogue box is presented whereby the user can either select Cancel or Quit Test. Selecting Cancel allows the user to select a different LIMS file with fewer channels. Quit Test will unreserve the currently connected chassis and close the application to allow the user to modify either the desired LIMS file or, if possible, reconfigure the hardware settings via the settings .ini file to allow for a greater number of hardware channels in the task.

Upon choosing this file, the data is parsed, and relevant information extracted and updated in other parts of the code. Checks are performed to ensure the test batch name, which is the test log file name, do not contain any illegal characters that Windows cannot handle. The operator then proceeds to populate all remaining fields that have an asterisk. The desired logging rate is also specified here and if a value less than 60 is selected with the units of seconds, the value is coerced to 60 as it was agreed 60 seconds is more than enough data over the test duration time for analysis and interpretation. Only once all required fields have been populated and checks completed is the continue button enabled. The option to cancel is available at any time which takes the user back to the main screen.

If continue is pressed, checks are done to ensure the test file name does not currently exist. If it does not, the test continues unheeded, if it does a confirmation dialogue box appears asking if the operator would like to cancel or overwrite. Cancel takes them back the data entry screen, overwrite then asks the operator a second time to ensure they definitely want to perform this as the action cannot be undone.

Once data entry is complete, live channel data is shown with the number of channels matching that as selected in the data entry screen. The relevant buttons are enabled and disabled which allow the test to be started.

If instead of new test being selected, load test is selected a confirmation dialogue box asks the user to navigate to a file known as the Summary File for that test. The summary file contains all key event data and test specific information. When a file is selected by the operator, logical checks are performed to ensure a summary file has actually been selected. Once a valid file is selected, all the relevant data is parsed out and the monitoring system updated with all the relevant information that would have been provided by the data entry screen when starting a new test. That is all the operator has to do in order to get to the same point as if a new test had been created.

At this point, there is the option to cancel the test fully where a confirmation box confirms the user wants to do this. If selected, it clears all test data and reinitializes but stays connected to the network chassis. This option to cancel remains until the test has started whereby the description and function changes dynamically.

If start test is pressed at this point, the message-based state machine sequentially asks if the user wants to zero the channels, if the user wants to stabilize for a period of time, ensures everything is connected etc. Again, the whole process can be cancelled at any time. Assuming the test is continued, upon the final confirmation message being acknowledged, the test enables all alarms, enables logging and dynamically changes the button states and descriptions and displays the log time data and logging active indicator.

The auto log data is logged at the specified rate whilst manual log samples can be performed with the click of a button at any time, as many times as you like. The test log and time data show the start of test date and time, the elapsed time, the number of logs for each file type and a countdown till the next log. A red LED alternates between on/off at a rate of 2 Hz with a calculation for this based on the display update rate as set in the settings .ini file.

At this point, whilst the test is running, all live channel data is displayed. This included the current status of the channel as to whether the wire is suspected open circuit or healthy. The value that determines this is both the range of the hardware module but also the limits as set in the settings .ini file. If the channel resistance goes above the limit, the monitoring system writes this to the summary file and includes the date, time, the channel, the limit values and actual measured resistance etc. Once a channel is suspect open circuit, the date and time are displayed on the main screen and an indicator for that channel changes from green to red for clear and obvious indication that the wire has broken.

Whilst the test is running, the logging can be paused via a button. If this is pressed the descriptions change dynamically as well as the states of the other buttons. The operator can then decide to stop the test fully or enable the logs again.

If stop test is selected, a confirmation dialogue box is presented asking if a full unload of the test is desired, pausing of the test or cancel. A full unload stops logging, sets all controls and descriptions to their relevant states and closes all the log files. Pause simply disables the logging and alarms. If pausing the test, then resuming, the option is given to continue with or without the logs enabled. If they are not enabled, the test time data and logging indicator is not displayed, the logs are not enabled but the alarms are enabled.

At any point in the test, or indeed if the test is not running or connected to a network chassis, if an attempt to close the main panel is performed or the quit button is pressed, a confirmation asks whether you definitely want to perform that action. If the operator selects no, the event is ignored and the operator is returned to the main screen, however if yes is selected a sequence of events is set in action that stops all logging if enabled, disables the alarms if enabled, saves all files and closes them off, clears all test data in the monitoring system and reinitializes all parameters and controls and indicators to their default states. The monitoring system then invokes a stop command that closes the application.

If an error occurs that is not handled by the error handler, or the error is a critical error, the monitoring system behaves in a similar fashion to that of if the quit or panel close button had been invoked. In this scenario, all attempts are made to save the files and close the application as gracefully as possible to mitigate file corruption and data loss.

The sampling rate and the read rate are set within the .ini settings file. All logging intervals are based around the calculation of sample rate divided by the read rate. The reciprocal of this number gives us the sample read time which is used to allow relative and deterministic sampling and logging. This is the case for any combination of sample rate and read rate within the bounds of the hardware sampling specifications.

The sampling speed also has a direct influence on the amount of data being pushed onto the network which ideally needs to be kept low in order to keep network traffic to a minimum and help ease potential reading issue on the host end due to the amount of sampled data. Each channel is 24-bit. As an example, at 10 Hz sampling speed the bitrate is 240 bits per second, per channel. We have a maximum of 32 channels (16 resistance plus 16 temperatures, both 24-bit) thus 7,680 bits per second total. There are 8 bits in a byte thus 7,680/8=960 bytes of data per second for all channels. 960 bytes=0.960 KBps so not even one kilo bye per second. As a reference example a standard video on YouTube streams at ~94 KBps.

As another example, assuming use of the same 32×24-bit channels as above but with a sampling rate of 2 kHz, the bitrate is 48,000 bits per second, per channel, thus 1,536,000 bits per second total, or 1.536 Mbps. This equates to 192,000 bytes, or 192 KBps of data per second for all channels.

Alternative Measurement Methods

The above technique based on the PRT methodology is a simple yet highly effective means of measuring resistance; is easily scalable and also allows for temperatures to be taken via the same module, however it does have limitations. As previously discussed, a PRT-type system is limited to measuring within the range of 0Ω to 400Ω as this is the working range of a PT100, however the same principle of exciting the resisting element and measuring the generated voltage differential is exactly how thermistors work.

The main difference between thermistors and PRTs are their working range and their sensitivity to change in temperatures. Typically, thermistors have a much smaller working temperature range but are very sensitive to very minute changes in temperature; PRTs have a much lower level of sensitivity but allow for a much greater working temperature range. Whereas the PRT module is an all in one compensated module, to excite and read a sensor separately requires a separate current output module and analogue input voltage module. The accuracy of both modules must then be calculated at both extremes to understand the true accuracy of the setup. The PRT module in this application will always be more accurate as it has a set constant current output and dedicated range to measure all encompassed in a single compensated module.

Another method of detecting changes in resistance is via the use of a Wheatstone bridge. There are variants of the Wheatstone bridge which can be used to measure load, force, temperature and resistance etc. but all consist of the basic principle of four resistors which use two pairs of resistors sat in parallel with each other. Three of the resistors are static values; the fourth is a variable which changes according to temperature or actual changes in resistance.

Similar to the PRT and thermistor setup, the bridge is excited with either a voltage or current (AC or DC) and the corresponding differential signal read in. When all resistors are equal at the start of test, the bridge is considered to be balanced which would read as zero input. As the fourth resistor changes, be it due to temperature or actual change in resistance, the bridge is unbalanced proportionally, and a differential signal is measured proportionally to the voltage exciting it.

A disadvantage of the Wheatstone bridge in this instance is that whilst it is very accurate, all of the resistors in the bridge must be exposed to the same environmental temperature in order for it to be temperature compensated. Any change in temperature of one resistor will cause the bridge to experience errors in the differential output signal. The other temperature related issue in this instance is the self-heating effects which will be high and show as temperature offsets but be interpreted as actual changes in resistance. The only way to prevent this is to use much higher resistances but also use a specific Wheatstone bridge amplifier for precise control of the excitation voltage and signal measurement. UDIO AND R (R Development Core Team).

Data Analysis and Reporting

Symbols

Constants $r_0$=initial wire radius (e.g., set at 3.2×10−5 m).

$\rho_{standard}$=resistivity of wire metal at a standard temperature (1.68×10−8 Ωm at 20° C. for copper).

$T_{standard}$=standard temperature used for resistivity (e.g., set 20° C.).

$\alpha$=temperature coefficient of resistivity (3.86×10$^{-3}$ K$^{-1}$ for copper)

$l_{standard}$=standard length of wire (e.g., set at 1.01 m).

$\varepsilon_t$=tolerance allowed on oil temperature (e.g., set at 5° C.).

$T_{target}$=target oil temperature(e.g., one of 80, 100, 120, 130, 140 150, 170, and 180° C.).

Variables

R=measured resistance, ohms.

t=elapsed time, seconds.

T=measured oil temperature, ° C.

The input data may include the following input values (e.g., in columns, or as comma separated values (CSV)): date and time, measured temperature for each wire corrosion testing device in the solution phase, measured temperature for each wire corrosion testing device in the vapor phase, measured resistance for each wire corrosion testing device in the solution phase, measured resistance for each wire corrosion testing device in the vapor phase.

The following steps may be carried out for each wire corrosion testing device on both the solution and vapor phases individually:

1) Remove first 1 hour of data, as the temperature is unstable at this point. Set t=0 at the start of the trimmed data.

2) Calculate the resistivity at the measured temperature:

$$\rho = \rho_{standard} + ((T - T_{standard}) \times \alpha \times \rho_{standard})$$

3) Estimate length l, of the wire:

$$l = \frac{R_0 \pi r_0^2}{\rho_0}$$

where $R_0$ and $\rho_0$ are the measured resistance and calculated resistivity respectively at time t=0.

4) Calculate adjusted resistance, $R_{adjusted}$ as:

$$R_{adjusted} = \frac{R \times l_{standard}}{l}$$

5) Calculate radius as:

$$r = \sqrt{\frac{\rho \times l_{standard}}{\pi \times R_{adjusted}}}$$

6) Calculate corrosion, in nanometers, as $(r - r_0) \times 10^9$

7) Remove all data where $|T - T t_{arget}| > \varepsilon_t$

The data may be down sampled before plotted if a large number of data are collected. For example, if data is collected once every 10 seconds for 10 days, then 86,400 rows of data per oil are obtained. These can be down sampled by a factor of 100 or even 1000 without losing much information.

The data can be plotted on a graph of time vs corrosion (loss in radius), so that several lubricants can be compared. Alternatively, the same oil at multiple temperatures can be compared. A loess smoother can be fitted to each oil's data at each temperature individually. If there are >200 data points on an oil, a subset of 200 can be used for fitting the loess to improve computational speed. The fitted value for the smoother at t=0 is replaced by 0.

The overall corrosion rate can be calculated as the final fitted corrosion value, either at the end of test, or just before the wire breaks, divided by the time at which it was observed. The overall rate can be measured for the same fluid at a series of temperatures, and compared on an Arrhenius plot, which plots 1/ln(rate) vs 1/temperature in Kelvin.

Figure 23:
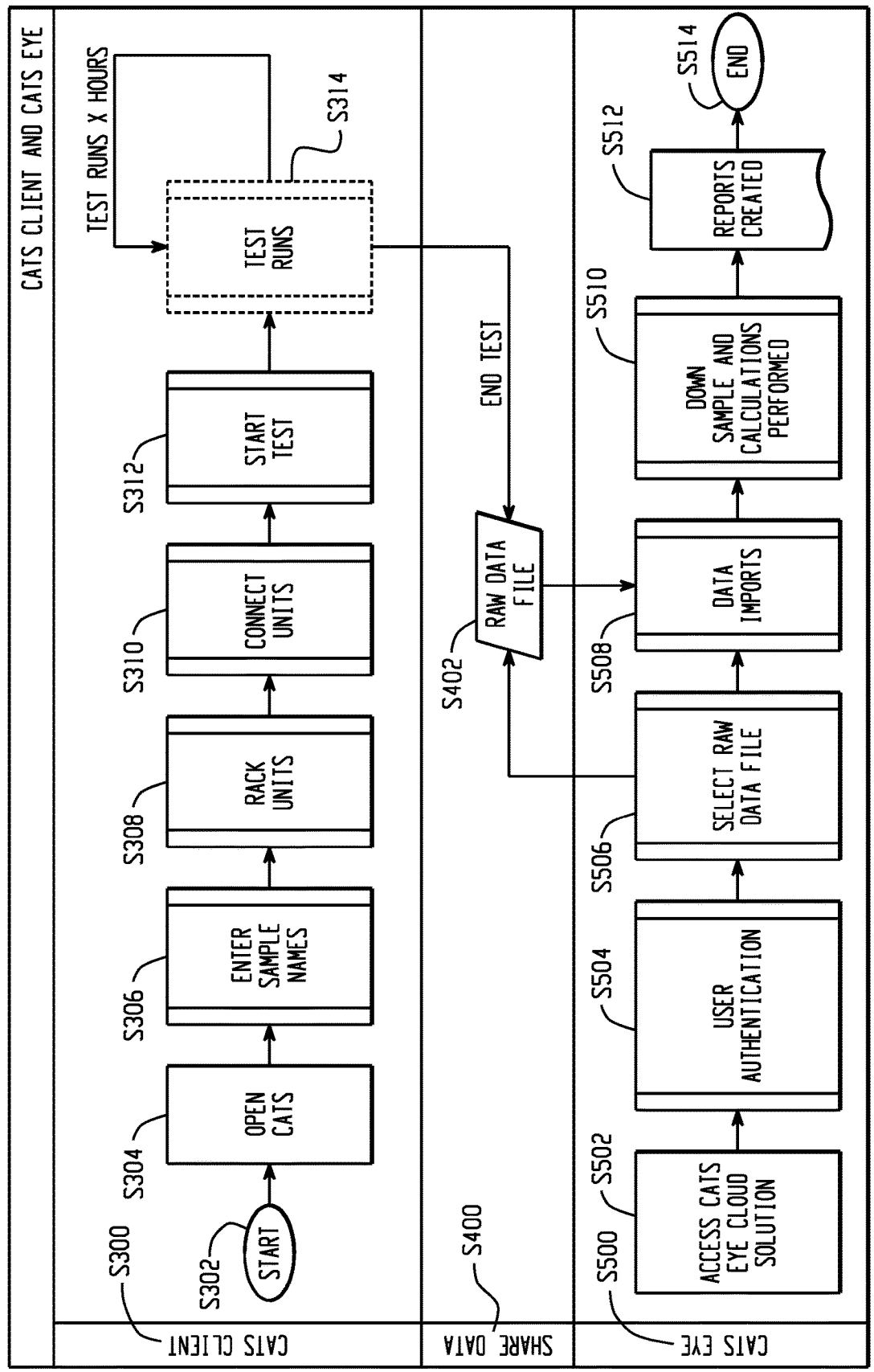
FIG. 23 is a flow chart illustrating parts of the method of FIG. 2, which may be performed with the monitoring system of FIG. 1.

FIG. 23 illustrates the data collection and processing in one embodiment. At S300, with the CATS client, the following steps are performed: At S302, the method is started. At S304, CATS is opened. At 306, sample names are entered, e.g., by a user, and stored. At 308, units are placed in racks. At S310, the units are connected. At S312, a test is started. At S314, the test runs. At S400 for storing data, a shared raw data file is created (S402).

At S500, with the CATS eye client, the following steps are performed: At S502, the CATS eye cloud solution may be accessed. At S504, user authentication is optionally performed. At S506, a raw data file is selected. At S508, data is imported from the raw data file. At S510, the data may be down sampled and calculations performed. At 512, reports 22 are created and output, and at S514, the data processing method ends.

The disclosed testing device, scaffold, and test apparatus can provide one or more of the following advantages:

1) reducing the time taken to install wires to be tested;
2) facilitating temperature measurements for both the solution and vapor phase temperature for use in the subsequent calculations and corrections;
3) time and resource savings by automating data processing and automatic reporting of wire corrosion results for both the solution and vapor phase wire testing, such as the automated quantitative calculation of corrosion products from measured electrical resistance of a wire of known initial thickness and length; normalization of the measurement data to account for temperature dependency and thermal expansion and variations in length; and significantly reducing the time to report out a test;
4) simultaneous solution and vapor phase corrosion measurements in real-time, with fully integrated sample management and automated data processing and interpretation;
5) automatically presenting generated data in multiple formats such as corrosion vs time and, if temperature data exists, a simple kinetic plot, such as an Arrhenius plot, may be generated;
6) ease of connecting the test wires to external wires through quick connections in a lid of the device;
7) a scaffold which supports both a solution wire and a vapor phase wire;
8) a lid of the device wire providing for electrical connections to test wires and temperature measuring devices to perform wire resistance measurements and temperature measurement;
9) a reduction in mass, relative to the single wire zig-zag peg design;
10) lower and upper wire support portions being different diameters to provide controlled routing wire lengths of the solution phase wire and vapor phase wire, respectively;
11) wire alignment notches in the scaffold to provide defined spacing of the solution phase and vapor phase wires;
12) wire connections for the solution wire and vapor wire on the lid of the device being of different sizes and/or shapes, thereby reducing operator error;
13) the scaffold having a flat base to provide stability for the scaffold during assembly and within the housing;
14) the lid having a tapered side all to seal against a container, the taper accommodating glassware dimension variations and reducing gaps between the lid and top of the container, which could causes air flow into the container, thereby causing poor temperature control of the solution and vapor phase; and
15) solution and vapor space temperature measurement using two RTD's in the test vessel to allow for temperature correction, one RTD utilized within the solution phase space and the other utilized in the vapor phase space.

EXAMPLE 1

A test is performed to simulate the corrosion of a coil of an automobile gearbox solenoid. Such solenoids often have a wire diameter of around 0.128 mm. The test wires 8, 9 used in the test are selected to have a diameter as close as possible to the actual solenoid wire but also have a resistance that is accurately measurable by the range of the monitoring system 20. The value selected for the test is a copper wire with a diameter of 0.064 mm at a nominal length of 1 m, which gives the following resistances for a given diameter:

| Diameter (mm) | Resistance ($\Omega$) |
| --- | --- |
| 0.064 | 5.22227 |
| 0.032 | 20.88909 |
| 0.016 | 83.55635 |
| 0.008 | 334.22538 |
| 0.0075 | 380.27421 |
| 0.07 | 436.53927 |

The test is performed using multiple copies of the test device 1 (as illustrated in FIGS. 1 and 12-20) and corresponding scaffolds 230, and the software described above.

A standard Ethernet based data acquisition chassis is used for one implementation of a testing apparatus as disclosed herein. TABLE 1 includes a list of the National Instruments hardware used.

TABLE 1

| Components used | | |
| --- | --- | --- |
| Item/Model Number | Description | NI P/N |
| NI cDAQ-9185 | 4-Slot Ethernet Chassis | 785064-01 |
| NI 9226 | 8-channel PT1000 RTD module, 50S/s/ch, DSUB | 783864-01 |
| NI 9216 | 8-channel PT100 RTD module, 50S/s/ch, DSUB | 783863-01 |
| NI 9923 | Front-mount terminal block for 37-pin D-Sub Modules | 781503-01 |
| NI 9901 | Desktop Mounting Kit for cDAQ-9185 chassis | 779473-01 |
| NI 9912 | DIN Rail Mount Kit for cDAQ-1985 | 779019-01 |
| — | Power Cord, 240 V, 10 A, U.K. | 763064-01 |
| — | Ethernet Cable, Thin Profile, 2 m, CAT-5E | 151733-02 |

As an alternative, an eight slot USB chassis and one 9217 PRT module are used for the monitoring system. These allow for direct and instant connection to the chassis within minutes with no concerns over communication loss. This chassis is also suitable to run the maximum number of channels that can fit in one suitable heating bath. A direct connection between each chassis and a laptop/PC is used. This arrangement may not be practical for commercial applications as USB cables running over long distances and the number of chassis would be limited to the number of USB ports on the laptop/PC. An Ethernet based chassis could easily overcome these issues.

Data is collected in a data file, e.g., as comma separated values, an example of which is shown in TABLE 2 below:

TABLE 2

Test Batch Identification, Ex. 1

| Date DD/MM | Time HH:MM:SS | Scaffold 1 Soln. resistance Ohms | Scaffold 1 Soln. Temp. ° C. | Scaffold 1 Vap. resistance Ohms | Scaffold 1 Vap. Temp. ° C. | Data for additional scaffolds . . . |
|---|---|---|---|---|---|---|
| 02/05 | 12:10:10 | 7.532 | 116.92 | 7.641 | 32.95 | |
| 02/05 | 12:11:10 | 7.62 | 120.58 | 7.67 | 86.06 | |
| 02/05 | 12:12:10 | 7.705 | 123.85 | 7.688 | 87.9 | |
| 2/05 | 12:13:10 | 7.777 | 126.63 | 7.696 | 89.65 | — |

Figure 24:
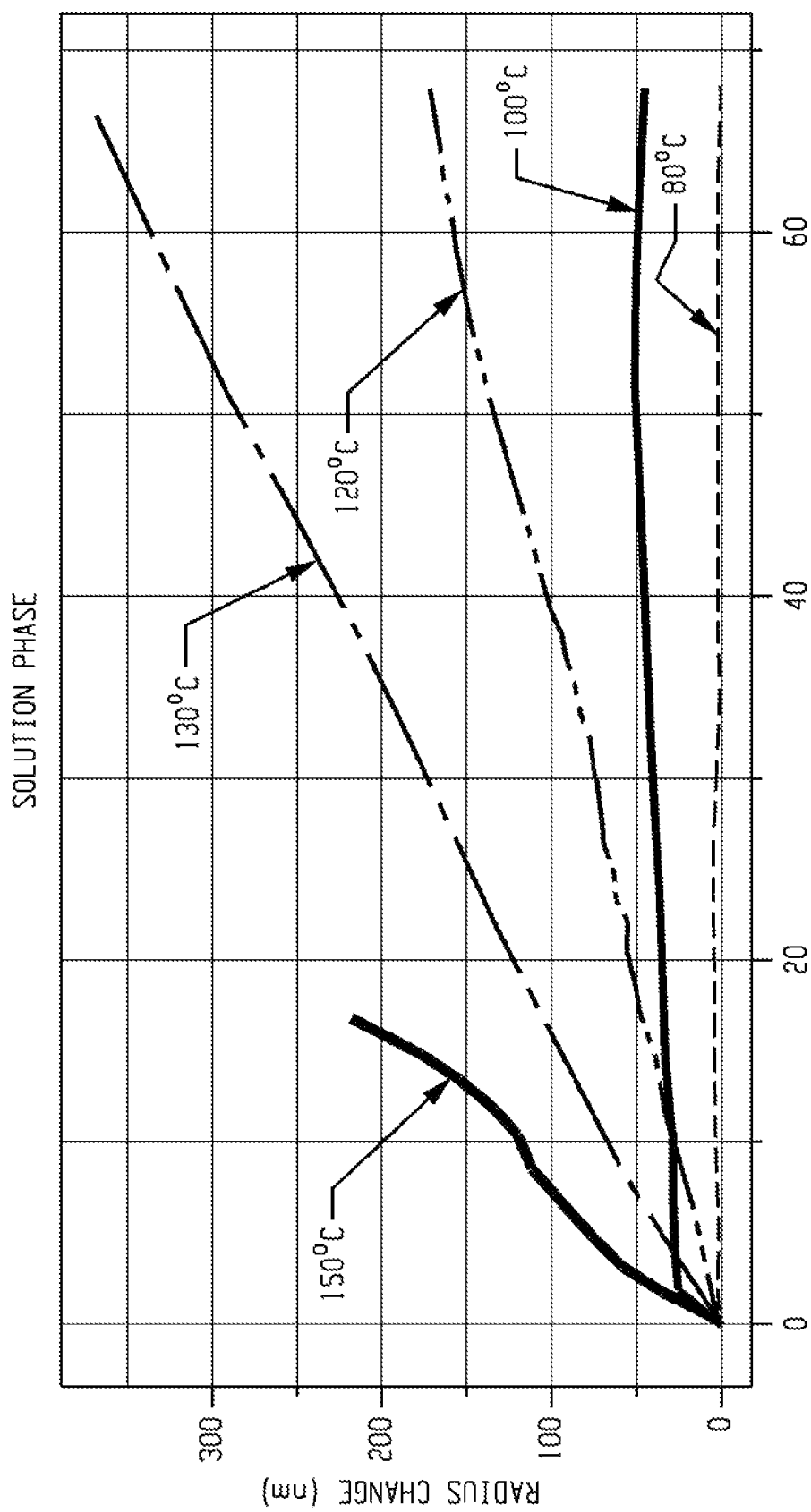
FIG. 24 is an example of a radius decrease in nm (representing corrosion) vs time plot for the solution space wire in a solution and vapor phase wire corrosion test according to an exemplary embodiment.
Figure 25:
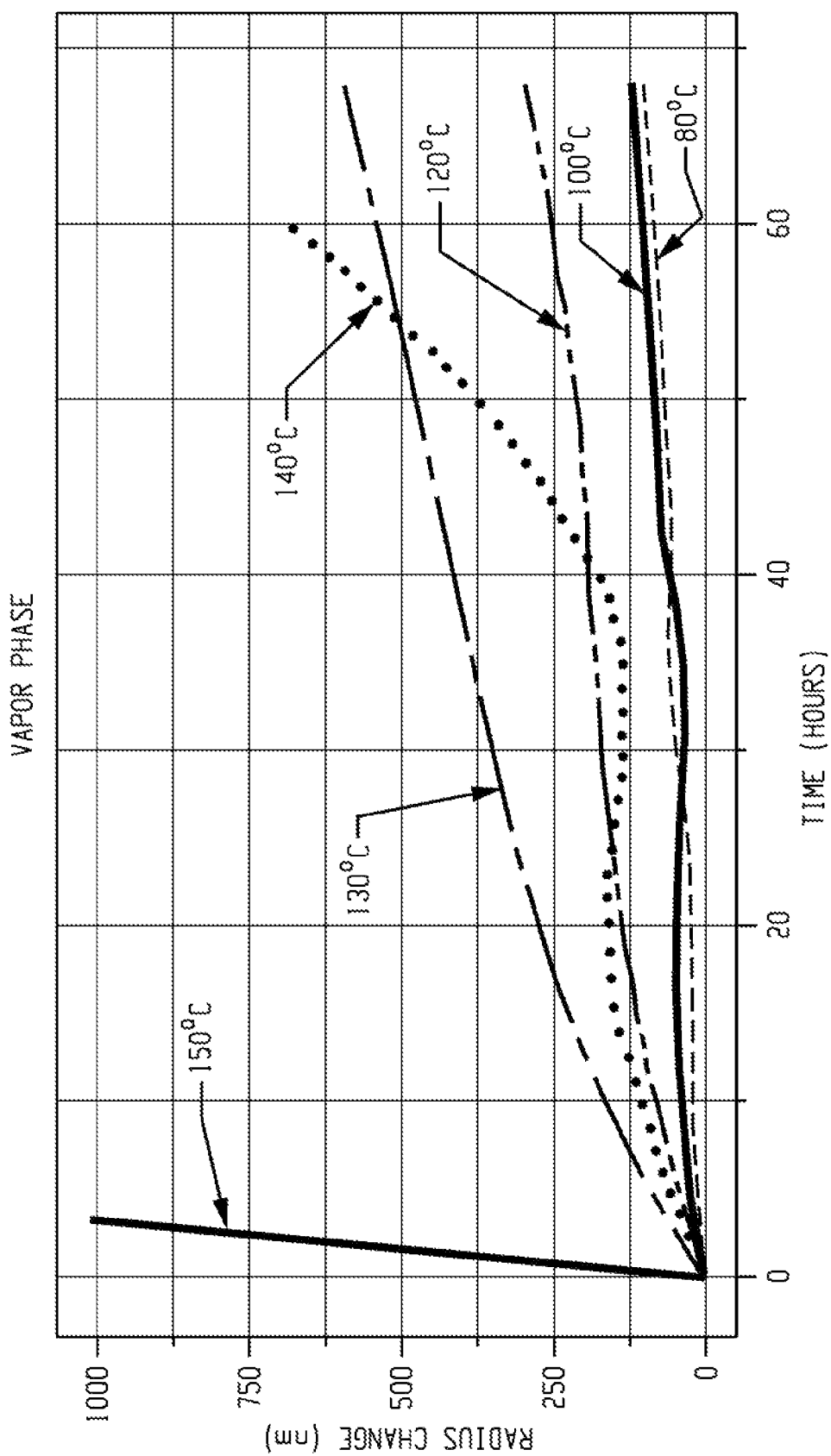
FIG. 25 is an example of a radius decrease in nm (representing corrosion) vs time plot for the vapor space wire in the solution and vapor phase wire corrosion test of FIG. 24.

FIG. 24 shows example graphs of radius change (in nm) vs time for wires undergoing a wire corrosion test in the solution phase over time at a plurality of temperatures, and FIG. 25 shows example graphs of radius change (in nm) vs time for wires undergoing a wire corrosion test in the vapor phase over time at a plurality of temperatures.

Figure 26:
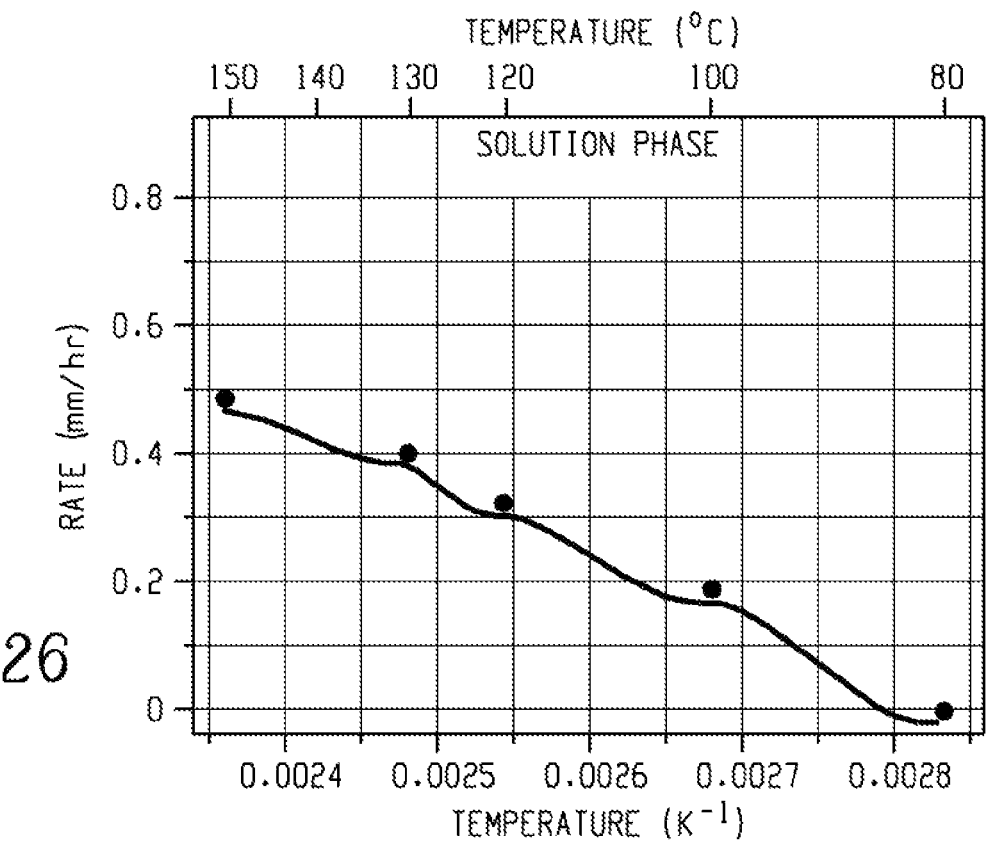
FIGS. 26 and 27 are examples of Arrhenius plots for a solution and vapor phase wire corrosion test according to an exemplary embodiment.
Figure 27:
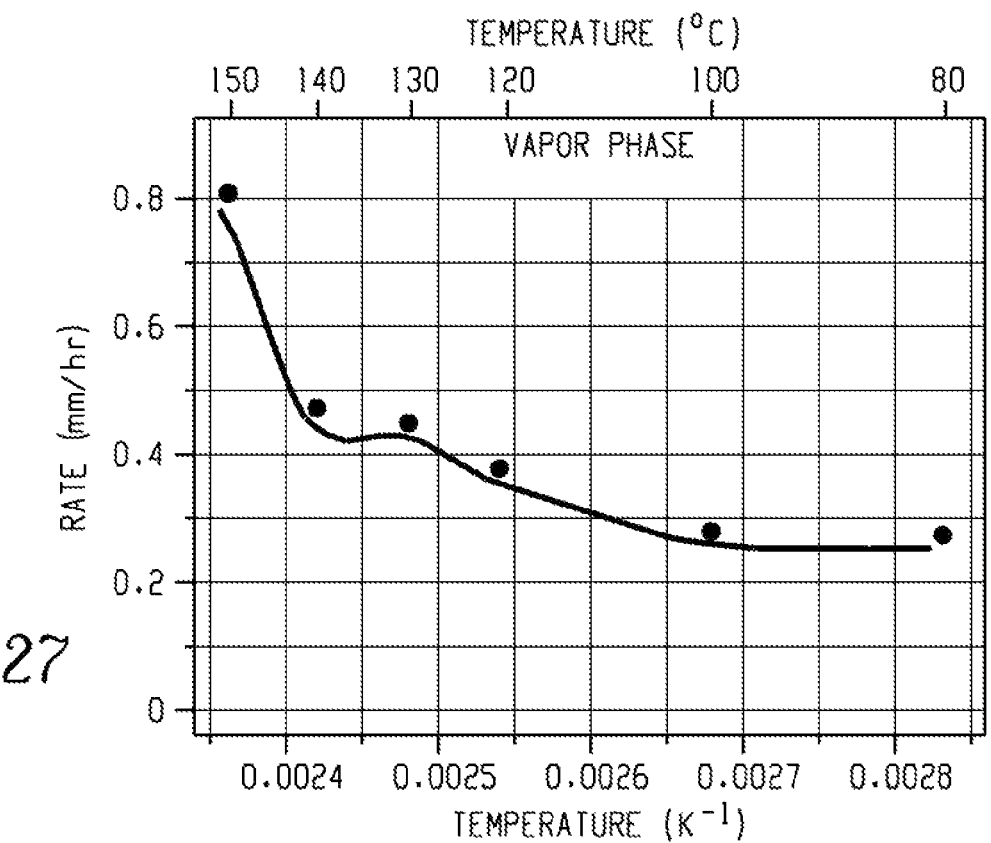

FIG. 26 shows an Arrhenius plot of the corrosion characteristics, i.e., corrosion rate as a function of temperature, of a solution phase wire, and FIG. 27 an Arrhenius plot of the corrosion characteristics, i.e., corrosion rate as a function of time, of a vapor phase wire, which may be generated from the graphs of FIGS. 24 and 25. The plots can be fitted to a straight line, if desired.

An output report 22 of a wire corrosion test may include one or more of the graphs of FIGS. 24-27 and/or a tabular representation of the corrosion characteristic of the solution phase wire and vapor phase wire over time for a plurality of temperatures. Table 3 illustrates an example table.

TABLE 3

Radius change at different temperatures

| Phase | Time (hours) | Mean Temp. (° C.) | Fitted radius change (nm) | Rate of loss (nm/hr) |
|---|---|---|---|---|
| Solution | 68.33 | 96.41 | 45.213 | 0.662 |
| Vapor | 68.33 | 65.61 | 114.002 | 1.668 |
| Solution | 68.33 | 115.19 | 171.243 | 2.506 |
| Vapor | 68.33 | 69.61 | 296.503 | 4.339 |
| Solution | 0 | 134.24 | 0 | |
| Vapor | 60 | 82.66 | 686.868 | 11.448 |
| Solution | 16.67 | 146.07 | 218.421 | 13.105 |
| Vapor | 3.33 | 104.39 | 1018.189 | 305.457 |
| Solution | 68.33 | 122.46 | 377.342 | 5.552 |
| Vapor | 68.33 | 71.41 | 597.305 | 8.741 |
| Solution | 68.33 | 78.15 | 0 | 0 |
| Vapor | 68.33 | 52.71 | 101.692 | 1.488 |

Figure 28:
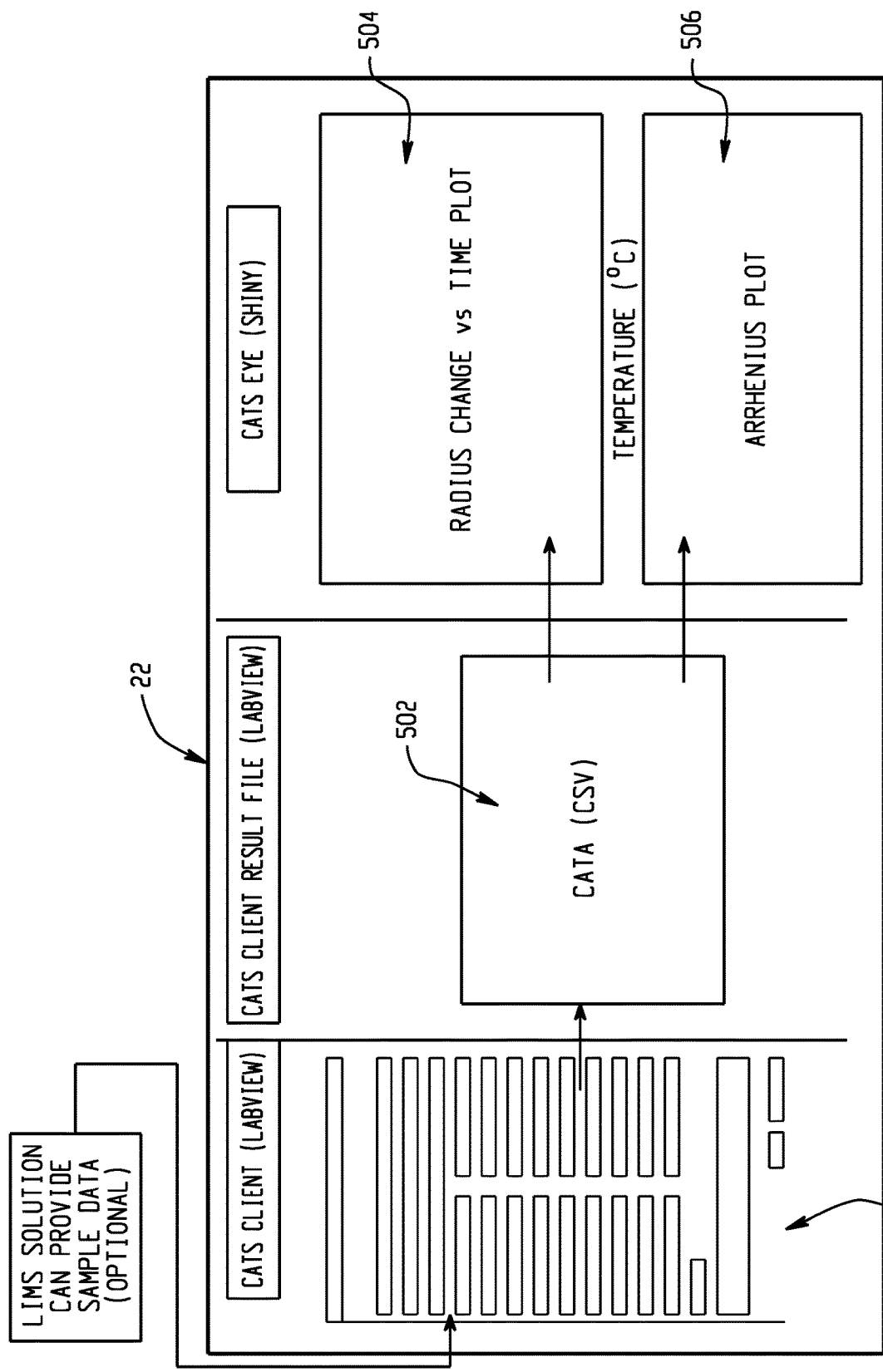
FIG. 28 is an example output report of a wire corrosion test.

FIG. 28 shows an example output report 22 of a wire corrosion test including input data 500 in LabView, temperature and wire radius data 502, and one or more plots 504, 506, e.g., a plot (or plots) 504 of the radius change of a solution phase/vapor phase wire over time at a plurality of temperatures, as illustrated in FIGS. 24 and 25, and an Arrhenius plot (or plots) 506, showing the corrosion rate as a function of temperature, of a solution phase/vapor phase wire, as illustrated in FIGS. 26 and 27.

In another test, plots of corrosion (radius change) vs time for a solution and vapor phase wire corrosion test for an oil which is aggressive towards copper are generated and compared with similarly acquired plots for the addition of four different additive packages in differing ratios. Table 4 shows results obtained.

TABLE 4

Data summary from FIG. 2 including ASTM D130 results

| Fluid | Start of Test Resistance Ω | End of Test Resistance Ω | Resistance Difference (Ω) | Gradient | Test Time (hrs) | % change | ASTM D130 (150° C./ 3 hrs) |
|---|---|---|---|---|---|---|---|
| Inhibitor #1 | 8.256 | 10.062 | 1.806 | 15.31 | 120 | 21.9 | 1B |
| Inhibitor #2 | 8.254 | 8.263 | 0.009 | 0.08 | 120 | 0.1 | 1A |
| Inhibitor #3 | 8.248 | 9.628 | 1.380 | 11.70 | 120 | 16.7 | 1B |

The use of corrosion inhibitors is seen to minimize the amount of copper corrosion (a very low increase in resistance with time) and is correlated with SEM-EDX (Scanning Electron Microscope-Energy Dispersive X-Ray) analysis of the copper wire post-test indicating an increase in the copper diameter resulting from the inhibitor layer used.

In comparison to the ASTM D130 corrosive strip surface analysis test method, previous unseen differences between fluids are easily observed with both differences in the total resistance and rate of resistance increase being examples of such phenomena that can now be used to quantify the copper corrosion for different fluids. In practice, only good and bad performing chemical formulations are distinguishable between each other when rated using the ASTM D130 method. However, using the methods and systems disclosed herein, differentiation between different lubricant formulations can be observed and quantified, providing information on corrosion that would previously been indistinguishable from the copper strip surface analysis only.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A scaffold comprising:
    a plurality of spaced lower support members, each of the plurality of spaced lower support members including a plurality of first routing supports for spacing a plurality of turns of an associated first test wire for immersion in a liquid phase of a test fluid, when the first test wire is wound around the plurality of lower support members spaced in the plurality of first routing supports;
    a plurality of spaced upper support members, each of the plurality of spaced upper support members including a plurality of second routing supports for spacing a plurality of turns of an associated second test wire for positioning above the liquid phase of the test fluid where the test fluid is in a vapor phase, when the second test wire is wound around the plurality of upper support members spaced in the plurality of second routing supports;
    a closure member, which provides for connections between ends of the first test wire and respective associated external first conductors, and connections between ends of the second test wire and respective associated external second conductors;
    the closure member, or a first, upper cross member attached thereto, being attached to a first end of each of the plurality of upper support members;
    a second cross member, longitudinally spaced from the closure member, the second cross member being attached to a first end of each of the plurality of lower support members and attached to a second end of each of the plurality of upper support members to laterally space the plurality of lower support members and the plurality of upper support members.

2. The scaffold according to claim 1 further comprising a third cross member, longitudinally spaced from the closure member by the second cross member, the third cross member being attached to a second end of each of the plurality of lower support members.

3. The scaffold according to claim 1, wherein at least one of the first routing supports on the lower support members includes an aperture for receiving the first test wire therethough.

4. The scaffold according to claim 1, wherein the plurality of first routing supports and the plurality of second routing supports are longitudinally spaced on the respective upper and lower support members.

5. The scaffold according to claim 1, wherein each of the lower support members includes at least three of the first routing supports, and each of the upper support members includes at least three of the second routing supports.

6. The scaffold according to claim 1, wherein the upper and lower support members are parallel to each other.

7. The scaffold according to claim 1, wherein there are at least four upper support members and/or at least four lower support members.

8. The scaffold according to claim 1, wherein the upper support members are arcuately offset from the lower support members.

9. The scaffold according to claim 1, wherein the second cross member includes arcuately spaced slots, with the second ends of the upper support members being received in alternate slots of the arcuately spaced slots, and with the first ends of the lower support members being received in remaining alternate slots of the arcuately spaced slots.

10. The scaffold according to claim 1, wherein the closure member includes holes for receiving first and second temperature sensors.

11. The scaffold according to claim 1, wherein an equal routing length for the first and second test wires is provided.

12. The scaffold according to claim 1, wherein the plurality of spaced lower support members are longitudinally aligned with a central axis of the scaffold, and the plurality of spaced upper support members are longitudinally aligned with the central axis of the scaffold.

13. In combination, the scaffold of claim 1; and included therewith the first and second test wires, wherein the first and second test wires are electrically conductive, wherein the combination comprises an assembly.

14. In combination, the scaffold of claim 1; and included therewith a housing shaped to receive the scaffold with the closure member of the scaffold closing an upper end of the housing to form a vessel for holding an associated and containing the test fluid, with the liquid phase of the test fluid in contact with the first test wire and any vapor phase of the test fluid present in contact with the second test wire, wherein the combination comprises a testing device.

15. The combination of claim 14, further comprising the following:
a liquid phase temperature sensor, positioned in the housing to measure a temperature of the liquid phase of the test fluid;
a vapor phase temperature sensor, positioned in the housing to measure a temperature of the vapor phase of the test fluid; and
a heater configured to heat the liquid in the housing to form the vapor.

16. The combination of claim 14, further comprising one of a first electrical system and a second electrical system, wherein
the first electrical system comprises the following:
a first current source connected across ends of the first test wire to supply a first electric current through the first test wire;
a second current source connected across ends of the second test wire to supply a second electric current through the second test wire;
a first voltmeter connected across ends of the first test wire to measure a first voltage across the first test wire; and
a second voltmeter connected across ends of the second test wire to measure a second voltage across the second test wire; and the second electrical system comprises the following:
a first voltage source connected across ends of the first test wire to generate a first voltage through the first test wire;
a second voltage source connected across ends of the second test wire to generate a second voltage through the second test wire;
a first ammeter connected across ends of the first test wire to measure a first electric current across the first test wire; and
a second ammeter connected across ends of the second test wire to measure a second electric current across the second test wire.

17. The combination of claim 14, further comprising the following:
first and second electrodes, wherein the first electrode is immersed in the liquid phase of the test fluid, and the second electrode is positioned above the liquid phase of the test fluid where the test fluid may be found is in the vapor phase;
a first voltage or current source, which is connected with the first electrode and which causes a first current to flow between the first electrode and the first wire; and
a second voltage or current source, which is connected with the second electrode, and which causes a second current to flow between the second electrode and the second wire.

18. In combination, the testing device of claim 16; and included therewith a monitoring system which receives signals from the first voltmeter and the second voltmeter or from the first ammeter and the second ammeter and computes and outputs information based thereon, wherein the combination comprises a testing apparatus.

19. The combination of claim 18, wherein the monitoring system further comprises the following:
a data acquisition component, which acquires at least one of an acquired first voltage and an acquired second voltage and an acquired first electric current and an acquired second electric current respectively through the first and second test wires over time;
a data analysis component, which processes the at least one of the acquired first voltage and the acquired second voltage and the acquired first electric current and the acquired second electric current at a plurality of times and computes the information based thereon; and
an output component, which outputs the information.

20. The combination of claim 19, wherein the information comprises a measure of corrosion of each of the first and second test wires.

21. The combination of claim 20, wherein the measure of corrosion of each of the first and second test wires includes a computed change in a diameter or radius of each of the first and second test wires.

22. The combination of claim 19, wherein the information includes a measure of corrosion as a function of temperature of the liquid.

23. A method comprising the following steps, which are not necessarily conducted in series:
wrapping a first test wire for immersion in a liquid phase of a test fluid around a plurality of spaced lower support members of a scaffold;
wrapping a second test wire for positioning above the liquid phase of the test fluid where the test fluid is in a vapor phase around a plurality of spaced upper support members of the scaffold;
providing a housing having an open end for receiving and containing a test fluid, and the scaffold and the first and second test wires wrapped around the plurality of spaced lower and upper support members;

providing a closure member for closing the open end of the housing;

introducing the test fluid to the housing;

inserting the scaffold and the first and second test wires wrapped around the plurality of its spaced upper and lower support members into the housing such that:

the first test wire wrapped around the plurality of spaced lower support members is immersed in the liquid phase of the test fluid;

the second test wire wrapped around the plurality of spaced upper support members is positioned above the liquid phase of the test fluid where the test fluid is in the vapor phase; and the closure member closes the open end of the housing;

heating the liquid phase of the test fluid in the housing so as to generate the vapor phase of the test fluid, which, when generated, contacts the second test wire wrapped around the plurality of spaced upper support members of the scaffold;

measuring at least one electrical property of each of the first and second test wires, which may change over time; and determining information based on any change in the electrical properties of each of the first and second test wires.

24. The method according to claim 23, wherein the measuring of the at least one electrical property of each of the first and second test wires over time comprises one of an electric current and a voltage, or of the electric current and voltage being controlled.

25. The method according to claim 23, wherein the test fluid comprises at least one of a coolant and a corrosion inhibitor.

26. A testing device comprising a scaffold for supporting associated spaced apart first and second test wires, the scaffold including a closure member; and a housing shaped to receive the scaffold with the first and second test wires, and having an open upper end, wherein the closure member of the scaffold closes the upper end of the housing to form a vessel for holding an associated test liquid in contact with the first test wire plus a vapor phase of the test liquid in contact with only the second test wire.

* * * * *